(12) United States Patent
Baba

(10) Patent No.: US 9,998,226 B2
(45) Date of Patent: Jun. 12, 2018

(54) ELECTRONIC TIMEPIECE, COMMUNICATION DEVICE, AND COMMUNICATION SYSTEM

(71) Applicant: Seiko Epson Corporation, Tokyo (JP)

(72) Inventor: Norimitsu Baba, Shiojiri (JP)

(73) Assignee: Seiko Epson Corporation (JP)

( * ) Notice: Subject to any disclaimer, the term of this patent is extended or adjusted under 35 U.S.C. 154(b) by 0 days. days.

(21) Appl. No.: 15/158,935

(22) Filed: May 19, 2016

(65) Prior Publication Data
US 2016/0342140 A1    Nov. 24, 2016

(30) Foreign Application Priority Data

May 22, 2015  (JP) ................................. 2015-104460

(51) Int. Cl.
*G04C 10/02* (2006.01)
*G04G 19/02* (2006.01)
(Continued)

(52) U.S. Cl.
CPC ............. *H04B 10/40* (2013.01); *G04C 10/02* (2013.01); *G04G 19/02* (2013.01); *G04G 19/10* (2013.01); *G04G 21/04* (2013.01); *G04R 20/04* (2013.01); *G04R 20/06* (2013.01); *H02J 7/007* (2013.01); *H02J 7/0031* (2013.01); *H02J 7/35* (2013.01); *H02S 40/38* (2014.12); *H02J 2007/0039* (2013.01); *H02J 2007/0096* (2013.01)

(58) Field of Classification Search
CPC .......... G04C 10/00; G04C 10/02; G04G 7/02; G04G 11/00; G04G 19/00; G04G 21/04; G04R 20/00; G04R 20/04
See application file for complete search history.

(56) References Cited

U.S. PATENT DOCUMENTS

| 4,511,259 A | * | 4/1985 | Horiuchi ................ G04B 47/00 368/10 |
| 4,800,543 A | * | 1/1989 | Lyndon-James ....... G04G 21/04 368/10 |
| 6,751,164 B1 | | 6/2004 | Sekiguchi |
| 6,850,468 B2 | * | 2/2005 | Fujisawa .................. G04C 3/14 368/47 |

(Continued)

FOREIGN PATENT DOCUMENTS

| JP | 2000-321378 A | 11/2000 |
| JP | 2001-099964 A | 4/2001 |

(Continued)

OTHER PUBLICATIONS

Extended European Search Report for Patent Application No. EP 16170334.3 dated Oct. 19, 2016 (7 pages).

*Primary Examiner* — Vit W Miska
(74) *Attorney, Agent, or Firm* — Harness, Dickey & Pierce, P.L.C.

(57) ABSTRACT

A control circuit sets a detection period D1 in which the control circuit detects an output value of a solar cell and receives an optical signal, and charging periods C1, C2 in which a storage battery can be charged, during a reception period for receiving a data signal of transmission data transmitted from a communication target; controls a charging control circuit to disconnect the solar cell and the storage battery, and causes a detection circuit to detect the output value of the solar cell, during the detection period D1; and controls the charging control circuit to connect the solar cell and the storage battery during the charging periods C1, C2.

9 Claims, 34 Drawing Sheets

(51) Int. Cl.
*G04G 19/10* (2006.01)
*G04G 21/04* (2013.01)
*G04R 20/04* (2013.01)
*H04B 10/40* (2013.01)
*H02J 7/35* (2006.01)
*H02S 40/38* (2014.01)
*H02J 7/00* (2006.01)
*G04R 20/06* (2013.01)

(56) References Cited

U.S. PATENT DOCUMENTS

| | | | | |
|---|---|---|---|---|
| 8,493,817 B2* | 7/2013 | Baba | ............... | G01S 19/14 368/205 |
| 2005/0105401 A1* | 5/2005 | Akahane | ............... | G04R 20/00 368/187 |
| 2010/0097896 A1* | 4/2010 | Baba | ............... | G01S 19/14 368/47 |
| 2016/0190863 A1* | 6/2016 | Ogasawara | ............... | G04G 19/00 368/47 |
| 2016/0274550 A1* | 9/2016 | Ogasawara | ............... | G04C 10/02 |

FOREIGN PATENT DOCUMENTS

| | | |
|---|---|---|
| JP | 2001-343474 A | 12/2001 |
| JP | 2005-241403 A | 9/2005 |
| JP | 2006-105826 A | 4/2006 |
| JP | 2014-048136 A | 3/2014 |
| JP | 2014-053657 A | 3/2014 |
| WO | WO-2001-006329 A1 | 1/2001 |
| WO | WO-2015-041057 A1 | 3/2015 |

* cited by examiner

LOCAL TIME INFORMATION

| REGION INFORMATION (231) | TIME ZONE INFORMATION (2321) | TIME ZONE CHANGE INFORMATION (2322) | DST OFFSET INFORMATION (2323) | DST START INFORMATION (2324) | DST END INFORMATION (2325) | DST CHANGE INFORMATION (2326) |
|---|---|---|---|---|---|---|
| REGION 1 | UTC+9 | – | 0 | – | – | – |
| REGION 2 | UTC+8 | 2014.10.26 2:00 UTC+9 | 0 | – | – | – |
| REGION 3 | UTC+7 | – | +1 | 1:00 LAST SUNDAY IN MARCH | 2:00 LAST SUNDAY IN OCTOBER | NO DST STARTING 2015 |
| ... | ... | ... | ... | ... | ... | ... |

(232 spans columns 2321–2326; table = 230)

FIG. 12

CHANGE HISTORY

| DATE | REGION | CHANGE |
|---|---|---|
| 2013.2.15 | Chile | DST CHANGE |
| 2013.3.7 | Paraguay | DST CHANGE |
| 2013.3.11 | Cuba | DST CHANGE |
| 2013.3.28 | Israel | DST CHANGE |
| 2013.4.15 | Palestine | DST CHANGE |
| 2013.7.2 | Morocco & Western Sahara | DST CHANGE |
| 2013.7.8 | Israel | DST CHANGE |
| 2013.8.16 | Chile Easter Island | DST CHANGE |
| 2013.9.4 | Fiji | DST CHANGE |
| 2013.9.24 | Palestine | DST CHANGE |
| 2013.9.30 | Morocco & Western Sahara | DST CHANGE |
| 2013.10.2 | Brazil | DST CHANGE |
| 2013.10.25 | Libya | TIME ZONE CHANGE |
| 2013.11.4 | Brazil | TIME ZONE CHANGE |
| 2013.12.11 | Jordan | TIME ZONE CHANGE |

FIG. 13

FIG. 18A
ELECTRONIC TIMEPIECE
COIL OUTPUT WAVEFORM
M1
FIG. 18B
COMMUNICATION DEVICE
COIL RECEPTION WAVEFORM
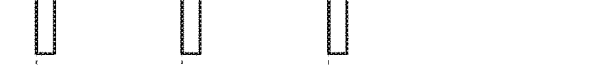
FIG. 18C
COMMUNICATION DEVICE
LED DRIVE WAVEFORM
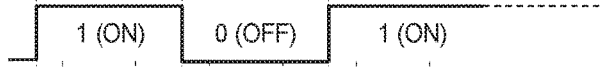
FIG. 18D  CHARGING TIME
CHARGING CONTROL SWITCH
FIG. 18E
VOLTAGE DETECTION TIMING
FIG. 18F  THRESHOLD (3000 Lx)
SOLAR CELL OUTPUT WAVEFORM
PVIN
VCC
FIG. 18G
VOLTAGE DETECTION RESULT
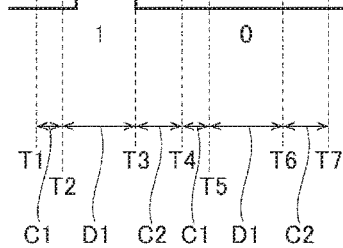

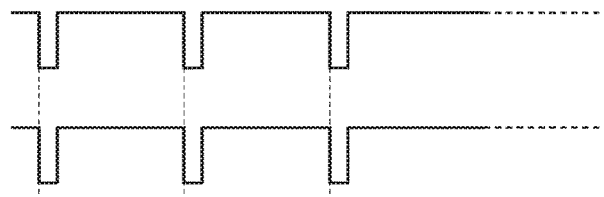
FIG. 22A ELECTRONIC TIMEPIECE COIL OUTPUT WAVEFORM M1
FIG. 22B COMMUNICATION DEVICE COIL RECEPTION WAVEFORM
FIG. 22C COMMUNICATION DEVICE LED DRIVE WAVEFORM
FIG. 22D CHARGING CONTROL SWITCH
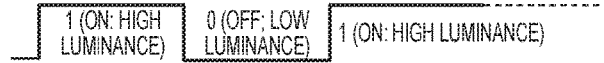
FIG. 22E VOLTAGE DETECTION TIMING
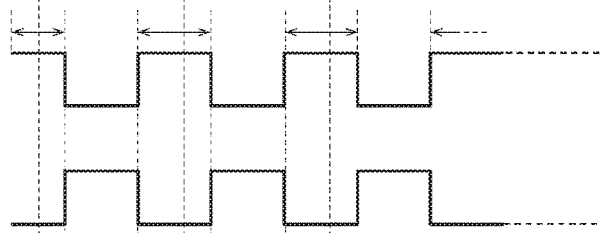
FIG. 22F SOLAR CELL OUTPUT WAVEFORM PVIN
FIG. 22G VOLTAGE DETECTION RESULT
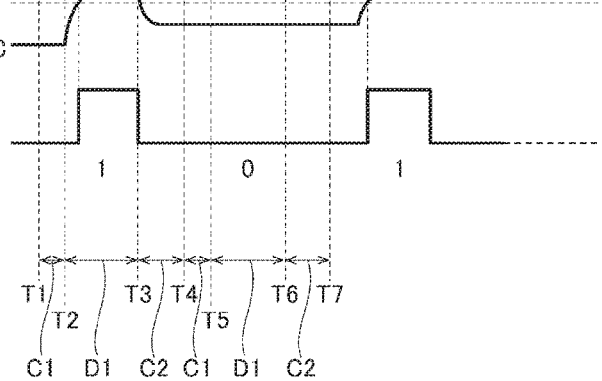

FIG. 34A
ELECTRONIC TIMEPIECE
COIL OUTPUT WAVEFORM
M1
FIG. 34B
COMMUNICATION DEVICE
COIL RECEPTION WAVEFORM
FIG. 34C
COMMUNICATION DEVICE
LED DRIVE WAVEFORM
FIG. 34D
CHARGING CONTROL SWITCH
FIG. 34E
VOLTAGE DETECTION TIMING
FIG. 34F
SOLAR CELL OUTPUT WAVEFORM
PVIN
FIG. 34G
VOLTAGE DETECTION RESULT
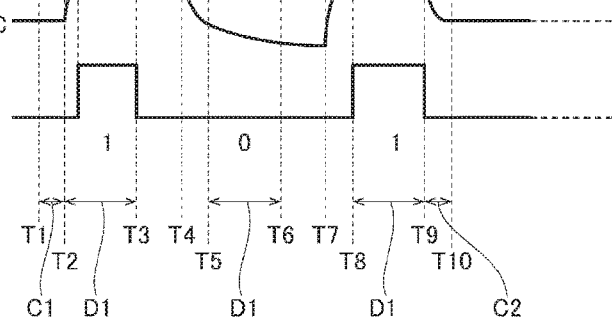

ELECTRONIC TIMEPIECE, COMMUNICATION DEVICE, AND COMMUNICATION SYSTEM

BACKGROUND

1. Technical Field

The present invention relates to an electronic timepiece configured to communicate data, to a communication device, and to a communication system.

2. Related Art

Electronic timepieces that use a solar cell to receive light and generate power, and receive optical signals transmitted from an external data transmission device are known from the literature. See, for example, JP-A-2001-99964.

When the electronic timepiece described in claim in JP-A-2001-99964 enters a data relay mode, it interrupts the charging path between the solar cell and the storage battery, detects the induced voltage of the solar cell while the charging path is interrupted, and evaluates the received signal by comparing the induced voltage with a reference voltage.

Because the charging path is always interrupted during data communication with the electronic timepiece in JP-A-2001-99964, the storage battery is not charged even when an optical signal is sent from an external data transmission device and the solar cell is exposed to light.

The capacity of the storage battery therefore drops if the storage battery is not charged because the electronic timepiece consumes power during data communication. This can result in data communication stopping due to insufficient power, which is not user friendly.

SUMMARY

An electronic timepiece, communication device, and communication system according to the invention can suppress a drop in battery capacity as a result of data communication.

An electronic timepiece according to the aspect includes: a solar cell that receives light and generates power; a detection circuit configured to detect an output value of the solar cell; a storage battery charged by power generated by the solar cell; a charging control circuit configured to connect and disconnect the solar cell and the storage battery; and a control circuit configured to control the detection circuit and the charging control circuit. The control circuit sets a detection period in which the control circuit detects the output value of the solar cell and receives an optical signal, and a charging period in which the storage battery can be charged, during a reception period for receiving a data signal of transmission data transmitted from a communication target; controls the charging control circuit to disconnect the solar cell and the storage battery, and cause the detection circuit to detect the output value of the solar cell, during the detection period; and controls the charging control circuit to connect the solar cell and the storage battery during the charging period.

A communication device that is the communication target has a light-emitting device, and transmits signals optically by controlling the emission state (such as whether the light-emitting device is on (emitting) or off (not-emitting)) of the light-emitting device.

The communication process is started in the aspect by, for example, the user operating a button or other input device disposed to the electronic timepiece and the communication device. When the communication process starts, the communication device transmits a data signal of the transmission data to the electronic timepiece.

The control circuit of the electronic timepiece sets a detection period and a charging period in the reception process during which a data signal is received. During the detection period of the reception period, the control circuit controls the charging control circuit to disconnect the solar cell from the storage battery, and causes the detection circuit to detect the output value of the solar cell. By disconnecting the solar cell and storage battery, the detection circuit can detect the output value of the solar cell without being affected by the voltage of the storage battery. As a result, the detection circuit can correctly receive the data signal.

During the charging period in the reception period, the control circuit controls the charging control circuit to connect the solar cell and the storage battery. As a result, when a data signal is transmitted from the communication device, light is incident to the solar cell of the electronic timepiece, and power is produced, the storage battery is charged by the power generated by the solar cell. As a result, a drop in the battery capacity resulting from the communication process can be suppressed.

An electronic timepiece according to another aspect preferably also has a transmission coil, and a coil drive circuit configured to drive the transmission coil. The control circuit controls the coil drive circuit to transmit a data request signal requesting transmission of the data signal by electromagnetic coupling; and the reception period is a period after the data request signal is transmitted and until the next data request signal is transmitted.

When a data request signal sent from the electronic timepiece is received, the communication device sends data signals one bit at a time or in blocks of plural bits to the electronic timepiece in response to reception of the data request signal.

The electronic timepiece sets a detection period and a charging period in the reception period between transmission of one data request signal and transmission of the next data request signal. As a result, the electronic timepiece can change the reception period by changing the transmission interval between the data request signals. This enables, for example, setting the length of the charging period appropriately to the battery capacity of the storage battery.

Further preferably in an electronic timepiece according to another aspect, the data signal is transmitted one bit at a time from the communication target; and the control circuit sets the detection period and the charging period in each reception period receiving the data signal of one bit.

This aspect enables increasing the total length of the charging period compared with a configuration that sets a charging period in each reception period in which a data signal of plural bits is received.

Further preferably, an electronic timepiece according to another aspect also has a data signal storage configured to store the received data signal; each time one block of data signals is received, the control circuit stores the received one block of data signals, and controls the charging control circuit to connect the solar cell and the storage battery while storing the one block of data signals to the data signal storage.

The communication device in this aspect stops transmission of the transmission data while the control circuit stores one block of received data signals in the data signal storage.

This aspect enables charging the storage battery if light is incident to the solar cell while the control circuit stores one block of received data signals to the data signal storage, and can suppress a drop in battery capacity due to the communication process.

An electronic timepiece according to another aspect preferably also has a data signal storage configured to store the received data signal. Each time one block of data signals is received, the control circuit stores the received one block of data signals, and controls the charging control circuit to connect the solar cell and the storage battery during a specific time before or after storing the one block of data signals to the data signal storage.

The communication device stops transmitting transmission data during this specific time.

Thus comprised, the storage battery can be charged during the specific time if the solar cell is exposed to light.

Because the process of storing data signals to nonvolatile memory or other data signal storage consumes power, battery capacity can be prevented from dropping while data signals are being stored to the data signal storage by charging the storage battery in a specific period before storing data signals to the data signal storage, and the data signals can be reliably stored in the data signal storage.

In addition, by charging the storage battery in a specific period after data signals are stored to the data signal storage, battery capacity can be restored even if the battery capacity drops as a result of storing data signals in the data signal storage.

An electronic timepiece according to another aspect preferably also has a battery voltage detection circuit configured to detect the battery voltage of the storage battery; and if the value detected by the battery voltage detection circuit is greater than or equal to a threshold in the charging period, the control circuit controls the charging control circuit to disconnect the solar cell and the storage battery.

Thus comprised, overcharging the storage battery can be prevented because the storage battery is not charged during the charging period even if light is incident to the solar cell if the storage battery is sufficiently charged and the output value of the battery voltage detection circuit is greater than or equal to the threshold.

An electronic timepiece according to another aspect preferably also has a battery voltage detection circuit configured to detect the battery voltage of the storage battery, and the control circuit sets the length of the reception period and the charging period according to the value detected by the battery voltage detection circuit.

This aspect can change the charging period according to the battery capacity. A drop in the battery capacity can therefore be reliably prevented by increasing the charging period when the battery capacity is low. The communication period can also be shortened by shortening the charging period and shortening the reception period when the battery capacity is high.

Another aspect is a communication device including: a light-emitting device configured to emit light; a light-emitting device drive circuit configured to drive the light-emitting device; and a device-side transmission controller configured to control the light-emitting device drive circuit and transmit the data signal by light by changing the emission state of the light-emitting device according to the value of the data signal of the transmission data. The device-side transmission controller also maintains the emission state of the light-emitting device in the state corresponding to the value of the data signal during the transmission period allocated to the data signal.

For example, when a first signal and a second signal of different values are included in the data signals, the device-side transmission controller causes the light-emitting device to emit when the data signal is a first signal, and turns the light-emitting device off (not emit) when the data signal is a second signal.

Thus comprised, when the communication device communicates with an electronic timepiece, for example, the storage battery of the electronic timepiece can be charged while the light-emitting device is on (emitting) during the charging period set in the electronic timepiece because the emission state of the light-emitting device is maintained. A drop in the battery capacity due to the communication process in the electronic timepiece can be suppressed.

Preferably in a communication device according to another aspect, a first signal and a second signal of different values are included in the data signals; and the device-side transmission controller causes the light-emitting device to emit when the data signal is the first signal, and turns the light-emitting device off when the data signal is the second signal.

Thus comprised, when the communication device communicates with an electronic timepiece, for example, the electronic timepiece can evaluate the first signal and second signal by determining whether or not light is incident to the solar cell based on the value detected by the detection circuit, and the evaluation process can be simplified.

Preferably in a communication device according to another aspect, a first signal and a second signal of different values are included in the data signals; and the device-side transmission controller causes the light-emitting device to emit at a first luminance level when the data signal is the first signal, and causes the light-emitting device to emit at a second luminance level that is lower than the first luminance level when the data signal is the second signal.

Thus comprised, when the communication device communicates with an electronic timepiece, for example, the solar cell of the electronic timepiece receives light of a first luminance when the light-emitting device emits at the first luminance level, and the solar cell of the electronic timepiece receives light of a second luminance that is lower than the first luminance when the light-emitting device emits at the second luminance level. By evaluating the luminance of light incident to the solar cell based on the value detected by the detection circuit, the electronic timepiece can determine whether a first signal or a second signal is received.

Because the solar cell of the electronic timepiece is exposed to light both when the data signal is a first signal and when the data signal is a second signal in this aspect, the storage battery can be charged more than when light is emitted to the solar cell only when the data signal is a first signal.

A communication device according to another aspect preferably also has an emission controller configured to control the light-emitting device drive circuit to cause the light-emitting device to emit after data signals for all transmission data is transmitted.

Thus comprised, when the communication device communicates with an electronic timepiece, for example, the battery capacity of the electronic timepiece can be restored even when the battery capacity drops due to the process of receiving transmission data by emitting light to the solar cell after the reception process ends. There is, therefore, no need to separately charge the electronic timepiece after the reception process, and ease of use can be improved for the electronic timepiece.

A communication device according to another aspect preferably also has an emission controller configured to control the light-emitting device drive circuit to cause the light-emitting device to emit before transmission of the transmission data starts.

Thus comprised, when the communication device communicates with an electronic timepiece, for example, the battery capacity of the electronic timepiece can be prevented from dropping while receiving the transmission data, and the reception process can be executed reliably.

Another aspect is a communication system including an electronic timepiece and a communication device.

The electronic timepiece includes a solar cell that receives light and generates power; a detection circuit configured to detect an output value of the solar cell; a storage battery charged by power generated by the solar cell; a charging control circuit configured to connect and disconnect the solar cell and the storage battery; and a control circuit. The control circuit is configured to control the detection circuit and the charging control circuit; set a detection period in which the control circuit detects the output value of the solar cell and receives an optical signal, and a charging period in which the storage battery can be charged, during a reception period for receiving a data signal of transmission data transmitted from a communication device; control the charging control circuit to disconnect the solar cell and the storage battery, and cause the detection circuit to detect the output value of the solar cell, during the detection period; and control the charging control circuit to connect the solar cell and the storage battery during the charging period.

The communication device includes a light-emitting device configured to emit light; a light-emitting device drive circuit configured to drive the light-emitting device; and a device-side transmission controller configured to control the light-emitting device drive circuit and transmit the data signal by light by changing the emission state of the light-emitting device according to the value of the data signal of the transmission data. The device-side transmission controller maintains the emission state of the light-emitting device in the state corresponding to the value of the data signal during a period in the reception period that includes the detection period and is longer than the detection period.

Thus comprised, the electronic timepiece can correctly receive data signals transmitted from the communication device during the detection period.

Furthermore, when a first signal and a second signal of different values are included in the data signals, for example, the device-side transmission controller of the communication device causes the light-emitting device to emit when the data signal is a first signal, and turns the light-emitting device off (not emit) when the data signal is a second signal, for example.

Thus comprised, because a charging period can be set during the period while the emission state of the light-emitting device is maintained, the storage battery can be charged while the light-emitting device is emitting, and the drop in battery capacity due to the communication process can be suppressed.

Preferably in a communication system according to another aspect, a first signal and a second signal of different values are included as the data signals in the transmission data. The device-side transmission controller executes an evaluation process determining whether the first signals or the second signals contained in the transmission data are most numerous; causes the light-emitting device to emit if the data signal is the first signal, and turns the light-emitting device off if the data signal is the second signal, when the number of first signals is greater than the number of second signals; and turns the light-emitting device off if the data signal is the first signal, and causes the light-emitting device to emit if the data signal is the second signal, when the number of second signals is greater than the number of first signals. The control circuit of the electronic timepiece receives the first signals and the second signals according to result of the evaluation process.

Because the communication device causes the light-emitting device to emit while transmitting the more numerous of the first signals and second signals contained in the transmission data, light can be emitted to the solar cell of the electronic timepiece for a longer time during transmission of all transmission data than if the light-emitting device emits while transmitting the less numerous signals. The solar cell can therefore be charged more.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 12 shows the data configuration of local time information in the first embodiment.

FIG. 13 shows an example of the change history of time difference information.

FIG. 18A to 18G are timing charts showing the signal output timing during data transmission in the first embodiment.

FIG. 22A to 22G are timing charts showing the signal output timing during data transmission in the second embodiment.

FIG. 34A to 34G are timing charts of the signal output timing during data communication in another variation.

DESCRIPTION OF EMBODIMENTS

Embodiment 1

Configuration of a Communication System

Figure 1:
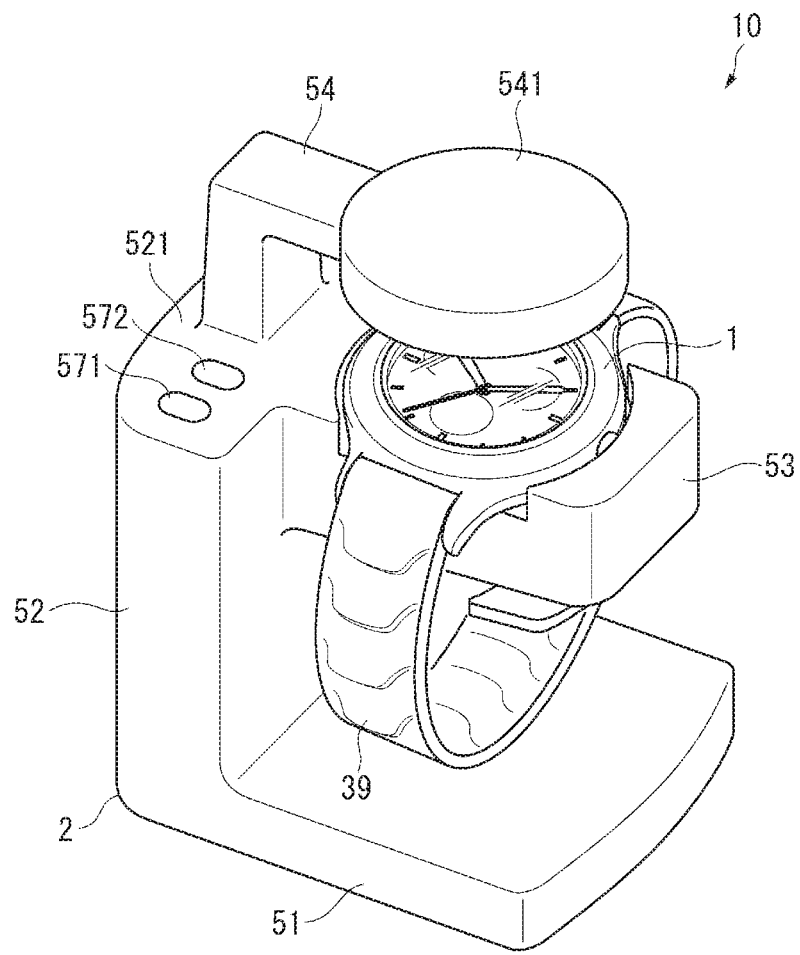
FIG. 1 is an external view of an electronic timepiece and a communication device in a communication system according to the first embodiment.
Figure 2:
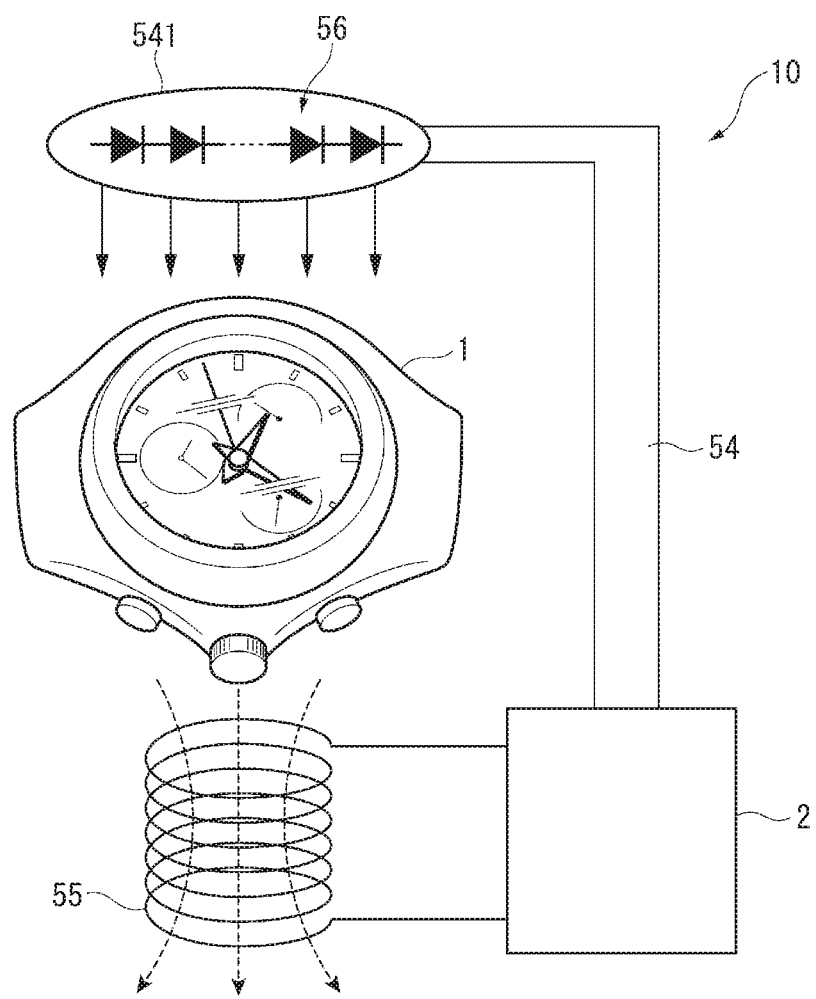
FIG. 2 illustrates the electronic timepiece and communication device in the communication system according to the first embodiment.

FIG. 1 is an external view of an electronic timepiece 1 and a communication device 2 in a communication system 10 according to a preferred embodiment. FIG. 2 illustrates the electronic timepiece 1 and communication device 2 in the communication system 10.

As shown in FIG. 1 and FIG. 2, the communication system 10 includes an electronic timepiece 1, and a communication device 2 that can communicate (send and receive signals) with the electronic timepiece 1.

This electronic timepiece 1 is an analog wristwatch with hands. As described further below, the electronic timepiece 1 has a solar cell 135, which is a photodetector, and a motor coil 143.

The communication device 2 is an example of a communication target.

The communication device 2 includes a base 51, a main body 52 extending up from the base 51, and a stand 53 extending horizontally from the main body 52. An arm 54 is disposed to the top 521 of the main body 52, and a lamp 541 is disposed at the distal end of the arm 54.

A coil 55 that is part of the device-side receiver is housed inside the stand 53. A light-emitting device 56 is inside the lamp 541. The light-emitting device 56 in this embodiment is a LED (light-emitting diode).

The electronic timepiece 1 is placed (set) on the stand 53 with the back cover of the electronic timepiece 1 facing the surface of the stand 53. Because the stand 53 is a cantilever projecting from the main body 52, the back cover of the electronic timepiece 1 can be easily placed on the surface of the stand 53 even if the band of the electronic timepiece 1 is a continuous bracelet with a tri-fold buckle. As a result, the motor coil 143 of the electronic timepiece 1 and the coil 55 inside the stand 53 are in close proximity, enabling communication by means of electromagnetic coupling.

The lamp 541 is disposed so that light emitted from the light-emitting device 56 is incident to the surface of the electronic timepiece 1 placed on the stand 53 and is received by the solar cell 135.

A button A 571 for causing the communication device 2 to communicate with the electronic timepiece 1, and a button B 572 for turning the light-emitting device 56 on, are disposed on the top 521 of the main body 52.

When button A 571 is pressed, the communication device 2 starts the communication process with the electronic timepiece.

When button B 572 is pressed, the communication device 2 causes the light-emitting device 56 to light continuously. As a result, light is emitted continuously to the solar cell 135 of the electronic timepiece 1 set on the communication device 2, and the storage battery of the electronic timepiece 1 is charged. When a solar powered electronic timepiece is worn by the user, the solar cell is charged by light from fluorescent lights and other light sources, but when the electronic timepiece is left for a long time unused on a shelf, for example, the electronic timepiece may not be exposed to sufficient light, the battery is therefore not charged, and the capacity (duration) of the battery drops. To use an electronic timepiece with a low capacity battery, the user must expose the electronic timepiece to light and charge the battery. However, if the user is indoors, or it is cloudy or raining, the user may not be able to quickly charge the electronic timepiece. In such cases, the operator of the communication device 2 can quickly and conveniently charge the electronic timepiece by placing the electronic timepiece 1 on the communication device 2 and turning the light-emitting device 56 on to start charging.

The operator of the communication device 2 may be the user of the electronic timepiece, or the provider of a service related to the electronic timepiece, such as a retailer or repair technician.

Note that while not shown in the figures, openings for installing USB (Universal Serial Bus) memory sticks, SD memory cards, CDs (Compact Disc), DVDs (Digital Versatile Disk), or other storage media are also provided in the main body 52 of the communication device 2. A connector for connecting to the Internet or a personal computer through a cable is also disposed to the main body 52.

Operation of the Communication System

Figure 3:
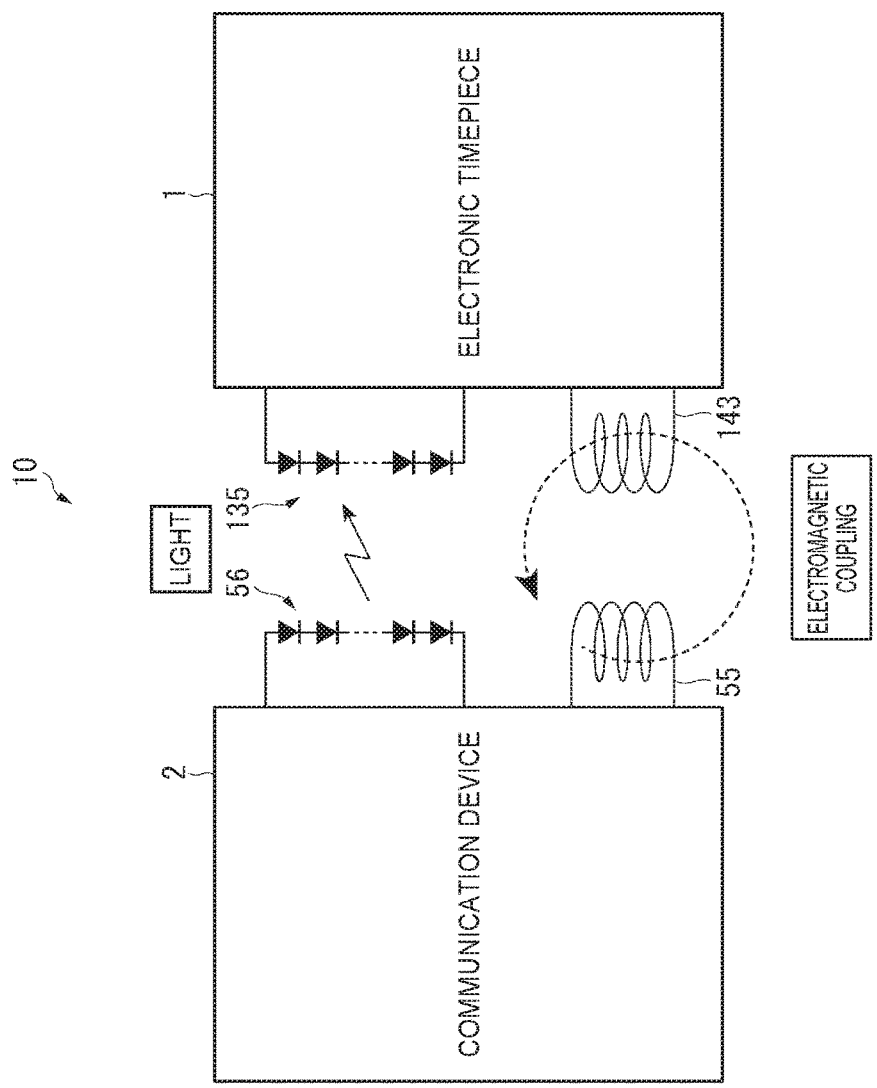
FIG. 3 schematically describes the operation of the communication system according to the first embodiment.

As shown in FIG. 3, when the electronic timepiece 1 outputs a pulse to the motor coil 143 in this communication system 10, a magnetic field is produced in the motor coil 143, an electromagnetic coupling is created between the motor coil 143 and the coil 55 of the communication device 2, and change in the field causes current to flow through the coil 55 and produces an induced voltage. Using this electromagnetic coupling, the electronic timepiece 1 transmits either a 1 signal denoting a 1, or a 0 signal denoting a 0, of a binary code (having the values 1 and 0) depending on whether or not a pulse is output to the motor coil 143. The communication device 2 receives the 1 signal or the 0 signal by detecting whether or not a voltage was produced in the coil 55. The communication device 2 and electronic timepiece 1 thus communicate by electromagnetic coupling.

When the communication device 2 drives and turns the light-emitting device 56 on, light is incident to the solar cell 135 of the electronic timepiece 1. Using this light, the communication device 2 sends a 1 signal or a 0 signal depending upon whether or not the light-emitting device 56 is emitting. Because the generated voltage changes according to whether or not light of a specific intensity is incident to the solar cell 135, the electronic timepiece 1 can receive the 1 signal or 0 signal by detecting the generated voltage. The communication device 2 and electronic timepiece 1 thus communicate by light.

As a result, if light other than the light from the light-emitting device 56 is incident to the electronic timepiece 1, the electronic timepiece 1 cannot receive signals correctly. The communication system 10 is therefore preferably used inside a light-tight dark box.

Electronic Timepiece Configuration

The electronic timepiece 1 is configured so that it can receive satellite signals and acquire time information from at least one GPS satellite in a constellation of multiple GPS satellites orbiting the Earth on known orbits, or receive satellite signals from at least three GPS satellites and calculate the current location (position) from the satellite signals.

General Configuration of the Electronic Timepiece

Figure 4:
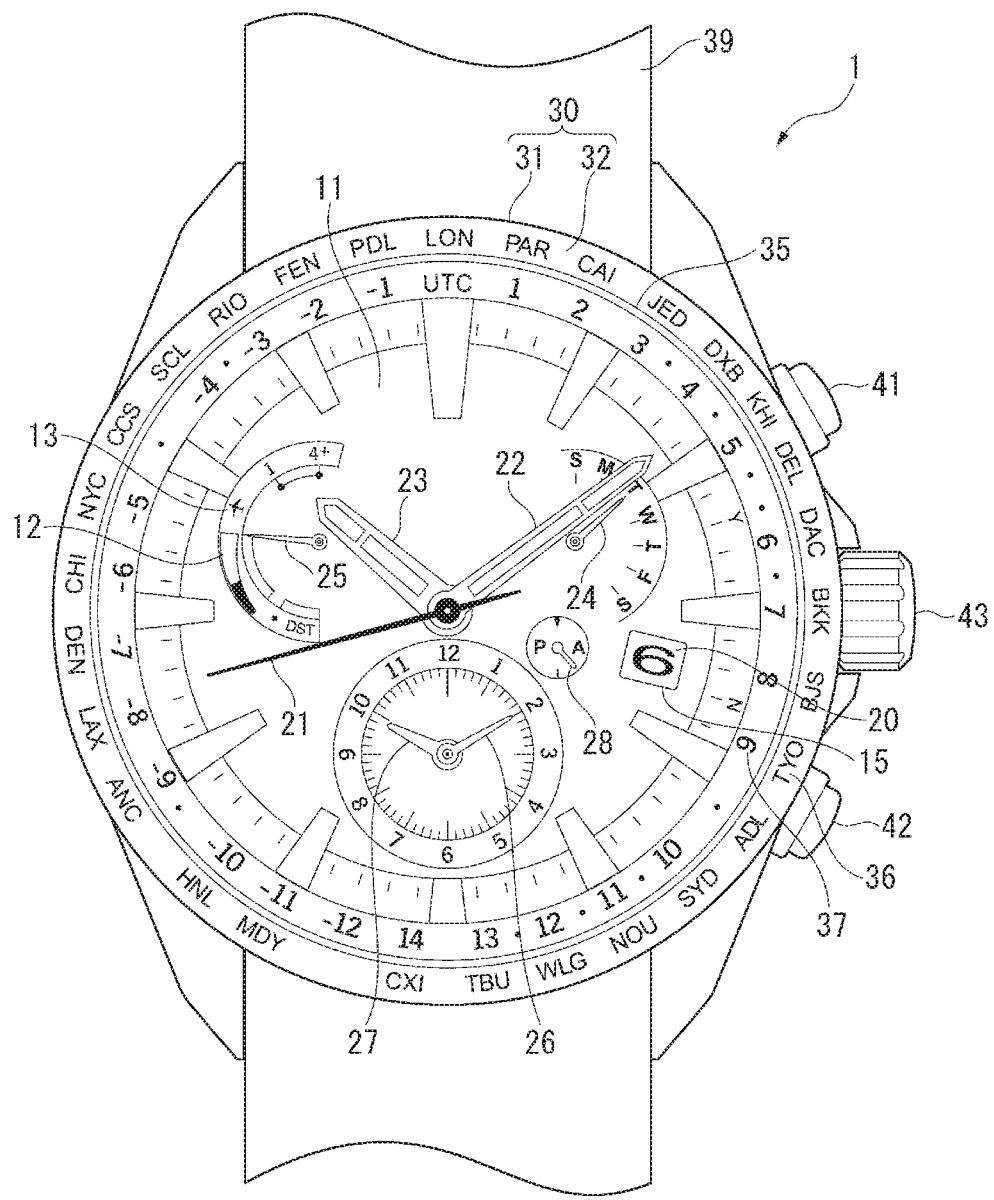
FIG. 4 is a plan view of an electronic timepiece according to the first embodiment.
Figure 5:
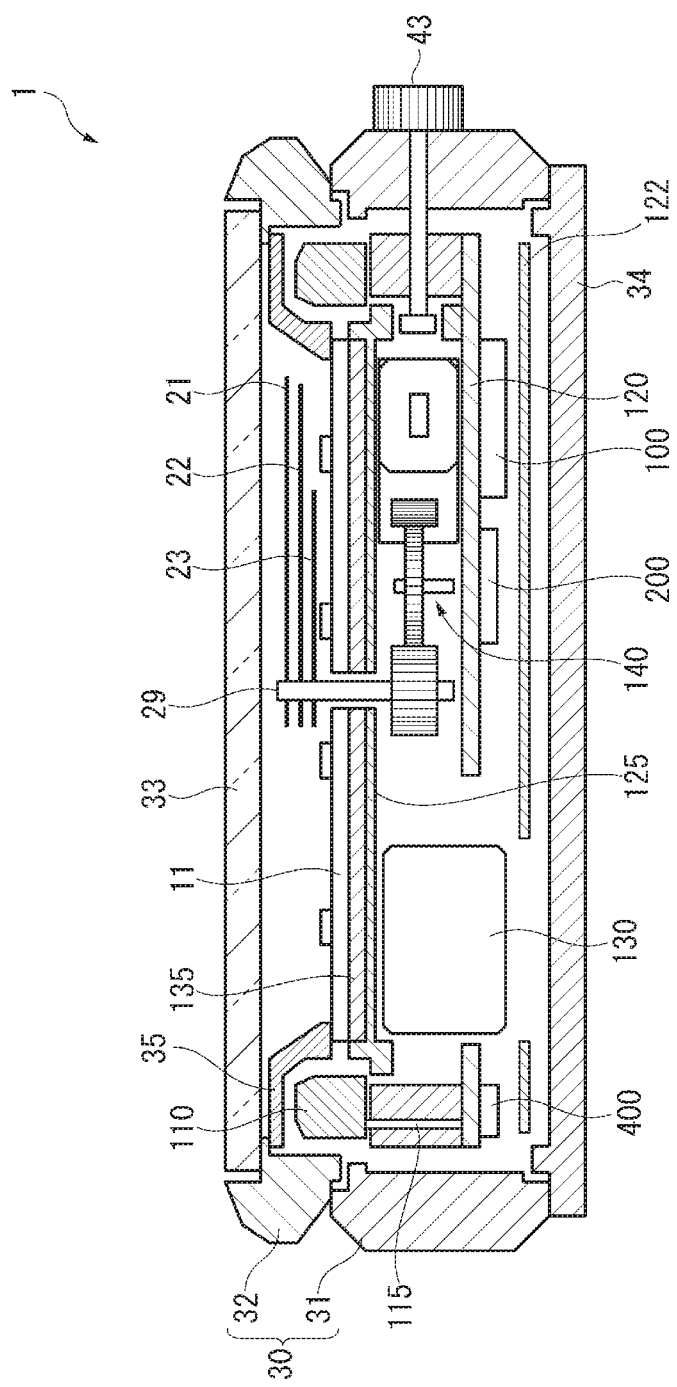
FIG. 5 is a section view of an electronic timepiece according to the first embodiment.

FIG. 4 is a plan view of the electronic timepiece 1, and FIG. 5 is a basic section view of the electronic timepiece 1.

As shown in FIG. 4 and FIG. 5, the electronic timepiece 1 has an external case 30, crystal 33, and back cover 34.

The external case 30 is configured with a ceramic bezel 32 affixed to a cylindrical case member 31 made of metal. A round dial 11 is held on the inside circumference side of the bezel 32 by means of a plastic dial ring 35.

Disposed in the side of the external case 30 are a button A 41, a button B 42, and a crown 43.

As shown in FIG. 5, of the two main openings in the case member 31, the opening on the face side is covered by the crystal 33 held by the bezel 32, and the opening on the back is covered by the metal back cover 34.

Inside the external case 30 are the dial ring 35 attached to the inside circumference of the bezel 32; the light-transparent dial 11; and a drive mechanism 140 that drives each of the hands 21, 22, 23, 24, 25, 26, 27, 28 and the date indicator 20.

The dial ring 35 is ring-shaped when seen in plan view, and is conically shaped when seen in section view. The dial ring 35 and the inside circumference surface of the bezel 32 create a donut-shaped space, and a ring-shaped antenna 110 is housed inside this space.

The dial 11 is a round disk for indicating the time inside the external case 30, is made of plastic or other optically transparent material, and is disposed inside of the dial ring 35 with the hands between the dial 11 and the crystal 33.

A solar cell 135, which is a photovoltaic power generator, is disposed between the dial 11 and a main plate 125 to which the drive mechanism 140 is disposed.

Figure 6:
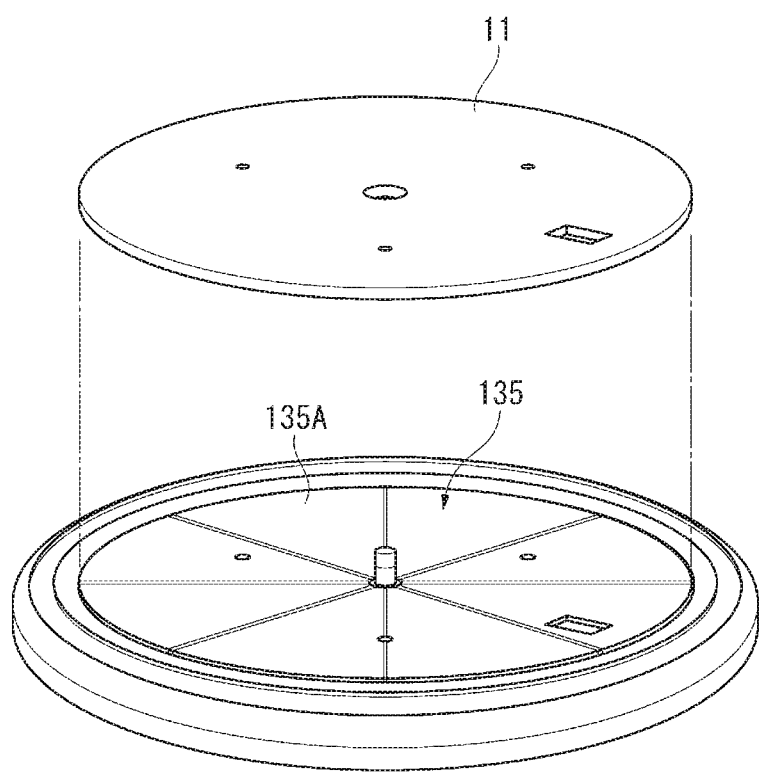
FIG. 6 is an oblique view of the solar cell in the first embodiment.

FIG. 6 is an oblique view of the solar cell 135 from the front of the timepiece. The solar cell 135 in this embodiment is a round flat solar panel having eight solar cells 135A (photovoltaic devices) that convert light energy to electrical energy (power) connected in series. The solar cell 135 is substantially the same size as the dial 11.

Through-holes through which the center arbor 29 of the hands 21, 22, 23 and the pivots (not shown in the figure) of the other hands 24, 25, 26, 27, 28 pass, and an aperture for the date window 15, are formed in the dial 11, solar cell 135, and main plate 125.

The drive mechanism 140 is disposed to the main plate 125, and is covered by a circuit board 120 from the back side. The drive mechanism 140 includes a stepper motor and wheel train, and drives the hands by the stepper motor rotationally driving the pivots through the wheel train.

The drive mechanism 140 more specifically includes first to sixth drive mechanisms. The first drive mechanism drives the minute hand 22 and hour hand 23; the second drive mechanism drives hand 21; the third drive mechanism drives hand 24; the fourth drive mechanism drives hand 25; the fifth drive mechanism drives hands 26, 27, and 28; and the sixth drive mechanism drives the date indicator 20.

The circuit board 120 has a GPS receiver 400, a control device 100, and a storage 200. The circuit board 120 and antenna 110 connect through an antenna connection pin 115. A circuit cover 122 covers the GPS receiver 400, control device 100, and storage 200 from the back cover 34 side of the circuit board 120 to which these parts are disposed. A lithium ion battery or other type of storage battery 130 is disposed between the main plate 125 and the back cover 34. The storage battery 130 is charged with power produced by the solar cell 135.

Display Mechanism of the Electronic Timepiece

The hands 21, 22, 23 are disposed to a center arbor 29 that passes through the dial in the plane center of the dial 11, and is aligned with the center axis between the front and back of the timepiece. Note that the center arbor 29 comprises three pivots (rotational pivots) to which the hands 21, 22, 23 are attached.

As shown in FIG. 4, a scale of 60 minute markers is formed on the inside circumference side of the dial ring 35 around the outside edge of the dial 11. Using these markers, hand 21 indicates the second of the first time (the local time, such as the current local time when travelling abroad), hand 22 indicates the minute of the first time, and hand 23 indicates the hour of the first time. Note that because the second of the first time is the same as the second of the second time described below, the user can also know the second of the second time by reading the second hand 21.

Note that the letter Y is disposed at the 12 minute marker on the dial ring 35, and the letter N is disposed at the 18 minute marker. The second hand 21 points to either Y or N to indicate the result of satellite signal reception.

Hand 24 is disposed to a pivot offset from the center of the dial 11 near 2:00, and indicates the day of the week.

Hand 25 is disposed to a pivot offset from the center of the dial 11 near 10:00.

DST and a black dot are disposed along the outside of the range of hand 25 rotation. DST denotes daylight saving time. The hand 25 points to either DST or the dot depending on whether or not the electronic timepiece 1 is set to the DST mode (DST meaning the daylight saving time mode is on, and the black dot meaning the DST mode is off).

A sickle-shaped symbol 12 is also along the outside of the range of hand 25 rotation. This symbol 12 is used as a reserve power indicator for the storage battery 130 (FIG. 5), and the power reserve is indicated by the hand 25 pointing to the position appropriate to the reserve power in the battery.

An airplane symbol 13 is also along the outside of the range of hand 25 rotation. This symbol is used to indicate the airplane mode. By pointing to the airplane symbol 13, the hand 25 indicates the airplane mode is set and signal reception is turned off.

The number 1 and symbol 4+ are also along the outside of the range of hand 25 rotation. These symbols are used to indicate the satellite signal reception mode. The hand 25 points to 1 when GPS time information is received and the internal time adjusted (in the timekeeping mode), and points to 4+ when receiving GPS time information and orbit information, calculating the positioning information indicating the current location, and correcting the internal time and time zone (in the positioning mode) as described below.

Hand 26 and hand 27 are disposed to a pivot offset toward 6:00 from the center of the dial 11. Hand 26 indicates the minute of the second time (home time, in this example, the time in Japan when travelling in a different country), and the other hand 27 indicates the hour of the second time.

Hand 28 is disposed to a pivot offset toward 4:00 from the center of the dial 11. This hand 28 indicates whether the second time is ante meridian or post meridian.

The date window 15 is a small rectangular opening in the dial 11 through which the date (number) printed on the date indicator 20 can be seen. The date indicator 20 displays the day value of the current date at the first time with the number that is visible through the date window 15.

Time difference information 37 indicating the time difference to UTC (Coordinated Universal Time) is denoted by numbers and non-numeric symbols around the inside circumference of the dial ring 35.

City name information 36 denoting the name of a city located in the time zone that uses the standard time corresponding to the time difference indicated by the time difference information 37 on the dial ring 35 is expressed beside the time difference information 37 on the bezel 32 surrounding the dial ring 35.

Circuit Configuration of the Electronic Timepiece

Figure 7:
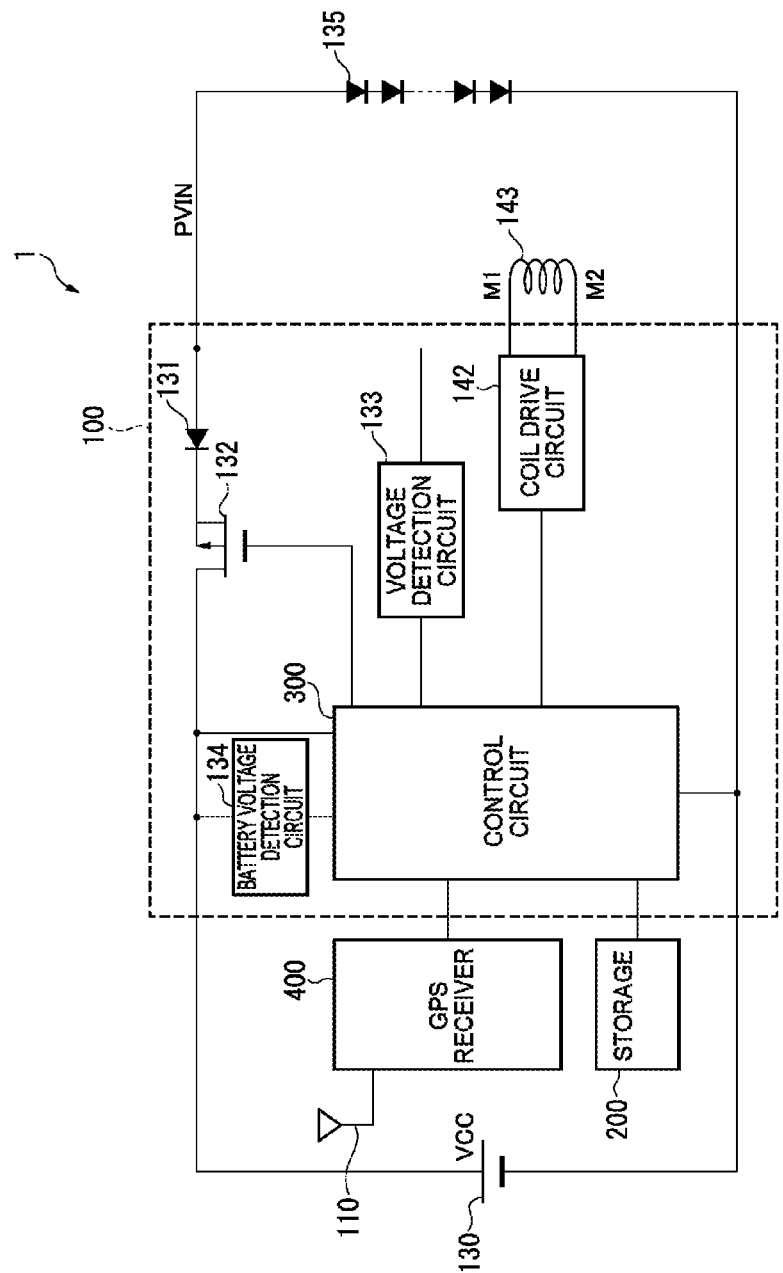
FIG. 7 is a circuit diagram of the electronic timepiece according to the first embodiment.

FIG. 7 is a circuit diagram of the electronic timepiece 1.

As shown in FIG. 7, the electronic timepiece 1 has a control circuit 300 including a CPU (central processing unit), the GPS receiver 400, storage 200, a storage battery 130 as a rechargeable power supply, the solar cell 135, a diode 131, a charging control switch 132, a voltage detection circuit 133, a battery voltage detection circuit 134, the motor coil 143, and the coil drive circuit 142. Note that the storage battery 130 is charged by current supplied from the solar cell 135.

The GPS receiver 400, storage 200, charging control switch 132, voltage detection circuit 133, and coil drive circuit 142 are connected to the control circuit 300.

The control circuit 300, diode 131, charging control switch 132, voltage detection circuit 133, and coil drive circuit 142 embody the control device 100.

Diode

The diode 131 is disposed on a path electrically connected to the solar cell 135 and the storage battery 130, and stops the flow of current (reverse current) from the storage battery 130 to the solar cell 135 without stopping the current flow (forward current) from the solar cell 135 to the storage battery 130. Note that the forward current flow is limited to when the voltage of the solar cell 135 is greater than the voltage of the storage battery 130, that is, when charging. When the voltage of the solar cell 135 becomes less than the voltage of the storage battery 130, the diode 131 prevents current from flowing from the storage battery 130 to the solar cell 135. A field-effect transistor (FET) may be used instead of the diode 131.

Charging Control Switch

The charging control switch 132 opens and closes the path of current from the solar cell 135 to the storage battery 130, and has a switching element disposed to the path that electrically connects the solar cell 135 and the storage battery 130. Current starts flowing when the switching element goes from off to on, and the current path is interrupted when the switching element goes from on to off. Note that the charging control switch is an example of a charging control circuit.

Voltage Detection Circuit

The voltage detection circuit 133 operates based on a control signal that specifies the voltage detection timing, and detects the terminal voltage PVIN of the solar cell 135, that is, the output voltage of the solar cell 135, while the charging control switch 132 is off. The voltage detection circuit 133 then compares the detected voltage with a previously set voltage threshold, and outputs the result to the control circuit 300.

Figure 8:
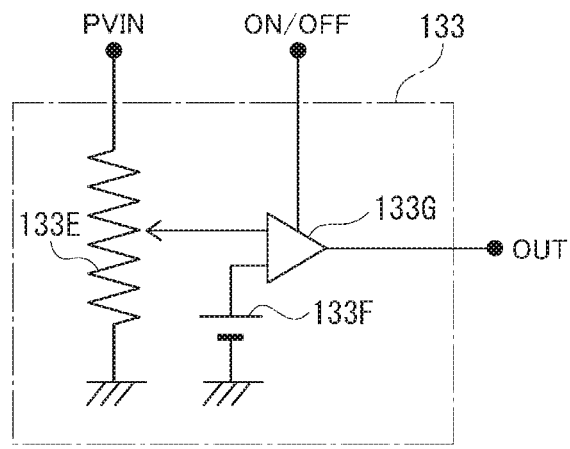
FIG. 8 is a circuit diagram of the voltage detection circuit in the first embodiment.

More specifically, the voltage detection circuit 133, as shown in FIG. 8, includes a resistive divider 133E, a regulator 133F as a reference voltage source, and a comparator 133G.

The voltage detection circuit 133 changes the voltage ratio of the resistive divider 133E according to the voltage threshold that is compared with the detected voltage. The voltage divided by the resistive divider 133E, and the reference voltage of the regulator 133F, are then compared by the comparator 133G, which outputs the result from the output node OUT to the control circuit 300.

The operation of the voltage detection circuit 133, and more specifically operation of the comparator 133G, is then controlled by the on/off signal from the control circuit 300.

Note that if the output voltage of the solar cell 135 is detected with the charging control switch 132 on, the threshold of the voltage detection circuit must be set to approximately VCC (battery voltage) +0.15 V. However, VCC varies with the battery capacity. The reference voltage cannot also not be changed at will. Setting the threshold is therefore difficult.

As a result, the voltage detection circuit 133 operates when the charging control switch 132 is off.

Battery Voltage Detection Circuit

The battery voltage detection circuit 134 detects the battery voltage of the storage battery 130 at an approximately 5 to 10 second interval, and outputs the result to the control circuit 300.

Coil Drive Circuit

The coil drive circuit 142 is connected to terminals M1 and M2 of the motor coil 143 of a stepper motor in the drive mechanism 140. The coil drive circuit 142 is controlled by the control circuit 300 to output a pulse to the motor coil 143, drive the drive mechanism 140, and move the hands. When the communication mode described below is enabled, the coil drive circuit 142 transmits a signal using the magnetic field produced by the motor coil 143 by controlling the pulses output to the motor coil 143.

Electronic Timepiece Functions

Figure 9:
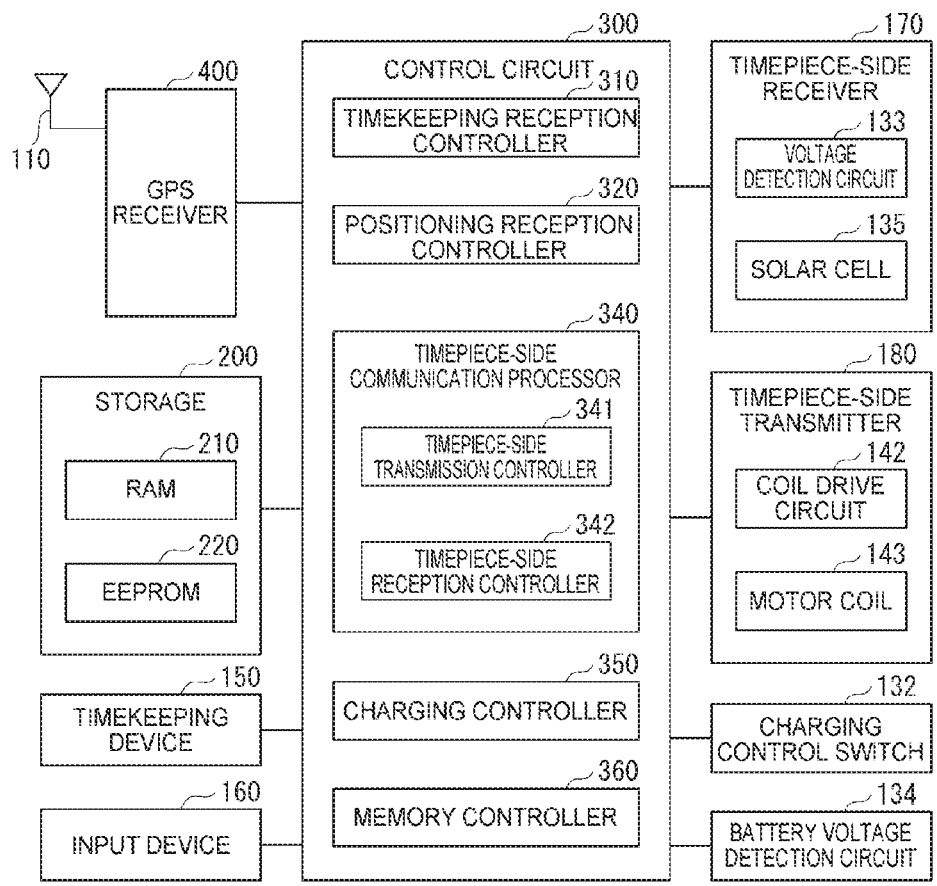
FIG. 9 is a control block diagram of the electronic timepiece according to the first embodiment.

FIG. 9 is a control block diagram of the electronic timepiece 1.

As shown in FIG. 9, the GPS receiver 400, storage 200, timekeeping device 150, input device 160, timepiece-side receiver 170, timepiece-side transmitter 180, charging control switch 132, and battery voltage detection circuit 134 are connected to the control circuit 300.

The timepiece-side receiver 170 is configured with the voltage detection circuit 133 and the solar cell 135 as a photodetector. The timepiece-side transmitter 180 is configured with the coil drive circuit 142 and the motor coil 143.

The voltage detection circuit 133 is an example of a detection circuit, and the motor coil 143 is an example of a transmission coil.

GPS Receiver

The GPS receiver 400 is connected to the antenna 110, processes satellite signals received through the antenna 110, and acquires GPS time information and positioning information. The antenna 110 receives satellite signals that are transmitted from the GPS satellites and pass through the crystal 33 and dial ring 35 shown in FIG. 5.

While not shown in the figures and similarly to a typical GPS receiver, the GPS receiver 400 includes an RF (radio frequency) circuit that receives and converts satellite signals transmitted from the GPS satellites to digital signals; a baseband circuit that executes a reception signal correlation process and demodulates the navigation data message; and a data acquisition unit that acquires GPS time information and positioning information (navigation data) from the navigation data message (satellite signals) demodulated by the baseband circuit.

Input Device

The input device 160 includes the crown 43, button A 41, and button B 42 shown in FIG. 4. The input device 160 detects operations invoking various processes based on the buttons 41, 42 being pushed and released, and the crown 43 being pulled out and pushed in, and outputs an operating signal corresponding to the detected operation to the control circuit 300.

Timekeeping Device

The timekeeping device 150 includes a crystal oscillator that is driven by power stored in the storage battery 130, and updates the time data using a reference signal based on the oscillation signal from the crystal oscillator.

Storage

The storage 200 includes RAM (random access memory) 210 and an EEPROM (electronically erasable and programmable read only memory) 220 as a nonvolatile memory device. Other types of nonvolatile memory, such as flash memory, may be used instead. EEPROM 220 is an example of a data signal storage.

Data Stored in RAM

Figure 10:
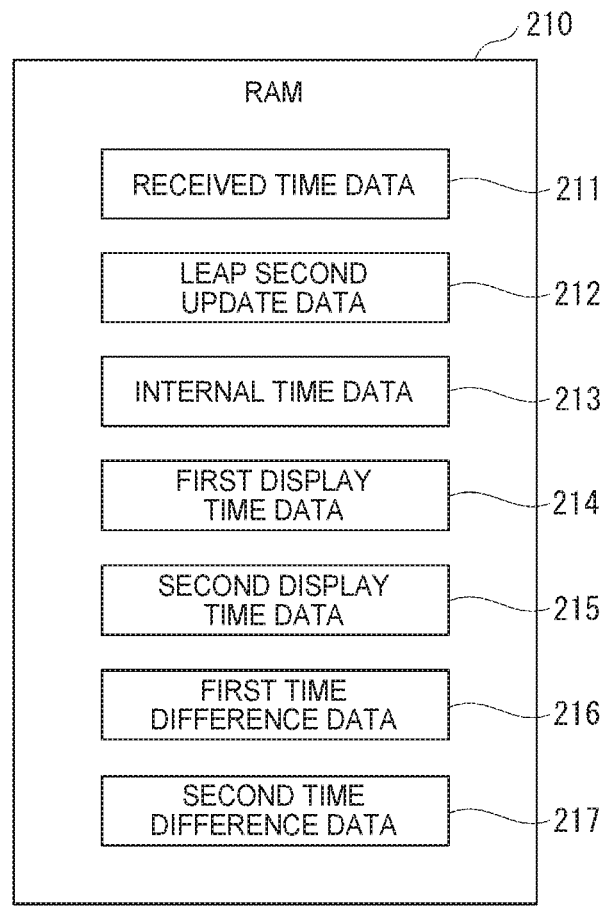
FIG. 10 illustrates the configuration of data stored in RAM in the first embodiment.

As shown in FIG. 10, received time data 211, leap second update data 212, internal time data 213, first display time data 214, second display time data 215, first time difference data 216, and second time difference data 217 are stored in RAM 210.

The received time data 211 stores the time information (GPS time) acquired from GPS satellite signals. The received time data 211 is normally updated every second by the timekeeping device 150, and when a satellite signal is received, the acquired time information is stored as the received time data 211.

The leap second update data 212 stores the current leap second data.

The internal time data 213 stores internal time information. More specifically, the internal time data 213 is updated based on the GPS time stored in the received time data 211 and the current leap second value stored in the leap second update data 212. As a result, UTC is stored as the internal time data 213. When the received time data 211 is updated by the timekeeping device 150, the internal time data is also updated.

The sum of the internal time stored in the internal time data 213, and the time difference of the first time difference data 216, is stored in the first display time data 214. The first time difference data 216 is set according to the time difference that is manually selected by the user or is acquired by reception in the navigation mode. The time expressed by the first display time data 214 is the first time that is displayed by the hands 21, 22, 23.

The second display time data 215 is set to the sum of the internal time expressed by the internal time data 213 and the time difference of the second time difference data 217. The second time difference data 217 is the time difference that is manually set by the user. The time expressed by the second display time data 215 is the second time displayed by the hands 26, 27, 28.

Data Stored in EEPROM

Figure 11:
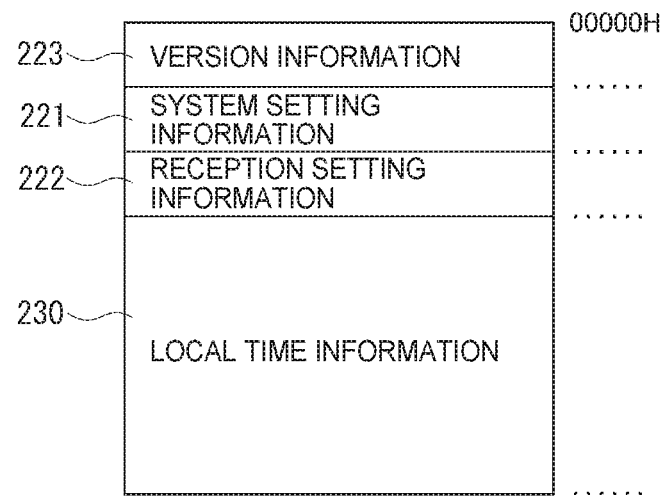
FIG. 11 illustrates the configuration of data stored in EEPROM in the first embodiment.

FIG. 11 shows an example of the structure of data stored in EEPROM 220.

EEPROM 220 stores a program executed by the control circuit 300, and data used when executing the program. More specifically, as shown in FIG. 11, in addition to the system setting information 221 and reception setting information 222 for driving the electronic timepiece 1, local time information 230 described further below and version information 223 indicating the version (edition) of the local time information 230, are stored to specific addresses in EEPROM 220.

Because EEPROM 220 is rewritable, the system setting information 221, reception setting information 222, local time information 230, and version information 223 can be updated.

The system setting information 221 includes the program run by the control circuit 300, parameters such as the rate and stepper motor drive settings, and leap second information including at least the current leap second.

The reception setting information 222 includes parameters used in the reception process of the GPS receiver 400, such as the time interval between automated attempts to receive satellite signals, and the timeout period for terminating the reception process when a satellite signal cannot be locked.

Local Time Information

FIG. 12 shows an example of the data structure of the local time information 230.

The local time information 230 stored in EEPROM 220 relates region information 231 (positioning information) and time difference information 232. When positioning information is acquired in the positioning mode, the control circuit 300 can acquire the time difference information based on the positioning information (latitude and longitude).

The time difference information 232 is information for acquiring the time difference to UTC in each region stored as region information 231, and includes time zone information 2321, time zone change information 2322, DST offset information 2323, DST start information 2324, DST end information 2325, and DST change information 2326.

The region information 231 is information identifying individual regions defined by dividing geographical information into plural regions. Each region is, for example, a rectangular region that is 1000 to 2000 km long east-west and north-south. Note that the geographical information is map information overlaid with time zones. Coordinate data defining each region is stored as the region information 231. More specifically, if each region is a rectangle, the region can be defined by the coordinates (latitude and longitude) of the top left corner and the coordinates (latitude and longitude) of the bottom right corner, and the coordinates for these two points are stored as the region information 231.

The time zone information 2321 identifies the time zone, or more specifically the time difference to UTC, in each region.

The time zone change information 2322 is information indicating a scheduled change in the time zone, and includes the date and time when the time zone of the particular region changes, and the time difference to UTC after the time zone changes. For example, as shown in FIG. 12, the time difference to UTC in region 2 will change from +8 to +9 hours from 2:00 in the morning of 2014 Oct. 26.

The DST offset information 2323 indicates the offset of DST (daylight saving time) in each region.

The DST start information 2324 indicates when DST starts in each region, and DST end information 2325 indicates when DST ends in each region.

The DST change information 2326 is information indicating a scheduled change in DST, and includes the date and time when the DST setting of a particular region changes, and the offset after the change.

For example, as shown in FIG. 12, in region 3, the DST offset is +1 from the last Sunday in March to the last Sunday in October, and the DST offset starting in 2015 is 0.

FIG. 13 shows an example of a change history of the time difference information.

As shown in FIG. 13, when the time zone information, which is time difference information, or the DST information changes, new local time information is created according to the change. New version information is also applied to the new local time information. This version information is information for displaying the version of the local time information by numbers, letters, or symbols. Note that new local time information may be created each time the time zone or DST changes, or according to a specific rule, such as when a specific time has past or there is a change in a specific time zone.

By thus appropriately updating the local time information according to change in the time zone or DST, the time difference to UTC can be more accurately acquired in each region.

Furthermore, by referencing the version information 223 applied to the local time information 230 stored in EEPROM 220, whether or not the local time information 230 is the same version as the most recent local time information, that is, is the newest version, can be easily determined.

Furthermore, when the local time information 230 was last updated, and what was changed, can also be known from the version information 223.

The system setting information 221, reception setting information 222, local time information 230, and version information 223 are stored in EEPROM 220 at the time of manufacture or shipping. This information may also be updated to the latest version by the data communication process described below. When data is updated, all data stored in EEPROM 220 may be replaced, or only the data that changed may be replaced.

Control Circuit

By running programs stored in the storage 200, the control circuit 300 functions as a timekeeping reception controller 310, a positioning reception controller 320, a timepiece-side communication processor 340, a charging controller 350, and a memory controller 360 as shown in FIG. 9.

Timekeeping Reception Controller

If the time reaches the automatic reception time that is set for a specific interval, or the amount of light incident to the electronic timepiece 1 exceeds a specific threshold and the electronic timepiece 1 can be determined to be outdoors exposed to sunlight, the timekeeping reception controller 310 determines that the automatic reception condition is met, and operates the GPS receiver 400 to execute the reception process in the timekeeping mode. The timekeeping reception controller 310 also operates the GPS receiver 400 and runs the reception process in the timekeeping mode if button A 41 is pressed for 3 seconds or more and less than 6 seconds to force (manually start) reception in the timekeeping mode. When the reception process runs in the timekeeping mode, the GPS receiver 400 locks onto at least one GPS satellite, receives satellite signals transmitted from that GPS satellite, and acquires time information.

Positioning Reception Controller

If button A 41 is pressed for 6 seconds or more to force (manually start) reception in the positioning mode, the positioning reception controller 320 operates the GPS receiver 400 and runs the reception process in the positioning mode. When the reception process runs in the positioning mode, the GPS receiver 400 locks onto to at least three, and preferably four or more, GPS satellites, receives signals transmitted from those GPS satellites, and computes and acquires positioning information. The GPS receiver 400 can simultaneously acquire time information when receiving the satellite signals in this event.

Note that this embodiment is configured to run the reception process in the timekeeping mode when the automatic reception condition is met, but may be configured to enable selecting running the reception process in the positioning mode.

Timepiece-Side Communication Processor

The timepiece-side communication processor 340 executes the communication process for communicating with the communication device 2. The timepiece-side communication processor 340 includes a timepiece-side transmission controller 341 and a timepiece-side reception controller 342.

The timepiece-side transmission controller 341 executes a transmission process to control the drive circuit 142 and send signals to the communication device 2 by electromagnetic coupling. The timepiece-side reception controller 342 executes a reception process to control the voltage detection circuit 133 and receive signals optically transmitted from the communication device 2.

Charging Controller

The charging controller 350 controls the charging control switch 132 and controls supplying power produced by the solar cell 135 to the storage battery 130.

Memory Controller

The memory controller 360 controls a process that stores data stored in RAM 210 to EEPROM 220.

The functional parts of the control circuit 300 are described below in the description of the communication process of the electronic timepiece 1. The control circuit 300 embodies the control circuit.

Communication Device Configuration

Figure 14:
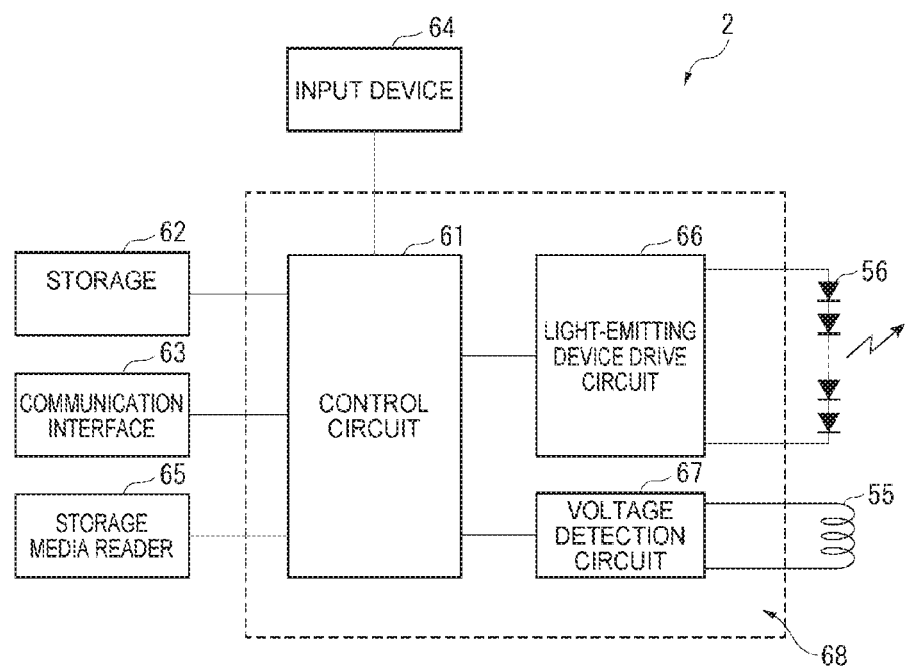
FIG. 14 is a circuit diagram of the communication device in the first embodiment.
Figure 15:
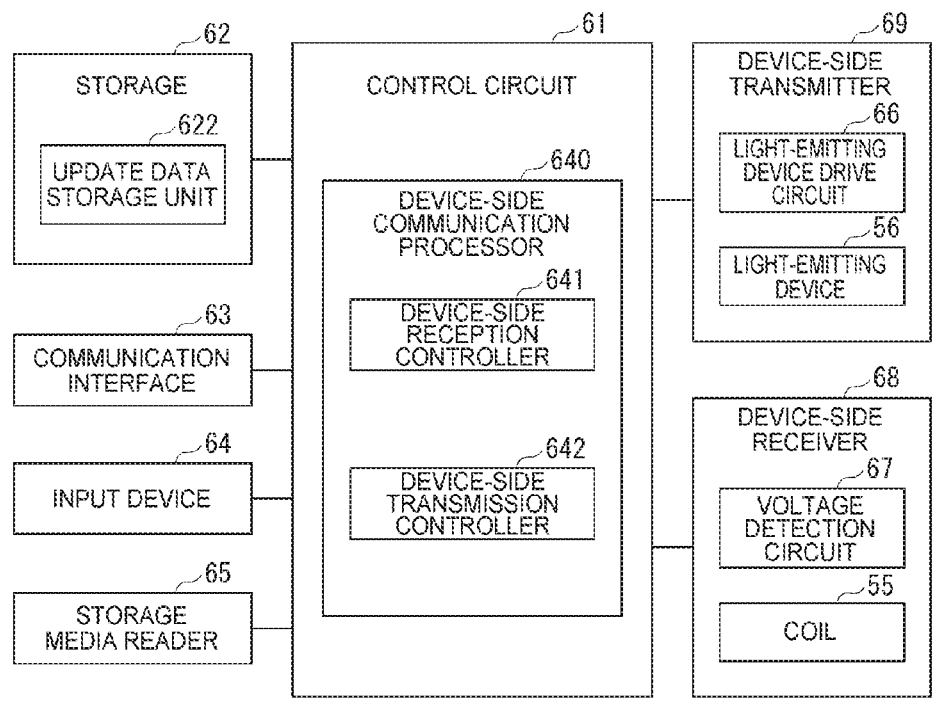
FIG. 15 is a control block diagram of the communication device in the first embodiment.

FIG. 14 is a circuit diagram of the communication device 2, and FIG. 15 is a control block diagram of the communication device 2.

As shown in FIG. 14 and FIG. 15, the communication device 2 includes a control circuit 61 comprising a CPU, a storage 62 comprising RAM, EEPROM, or other nonvolatile memory, a communication interface 63, an input device 64, a storage media reader 65, a light-emitting device drive circuit 66, a voltage detection circuit 67, the coil 55 (reception coil), and a light-emitting device 56.

Voltage Detection Circuit

Figure 17:
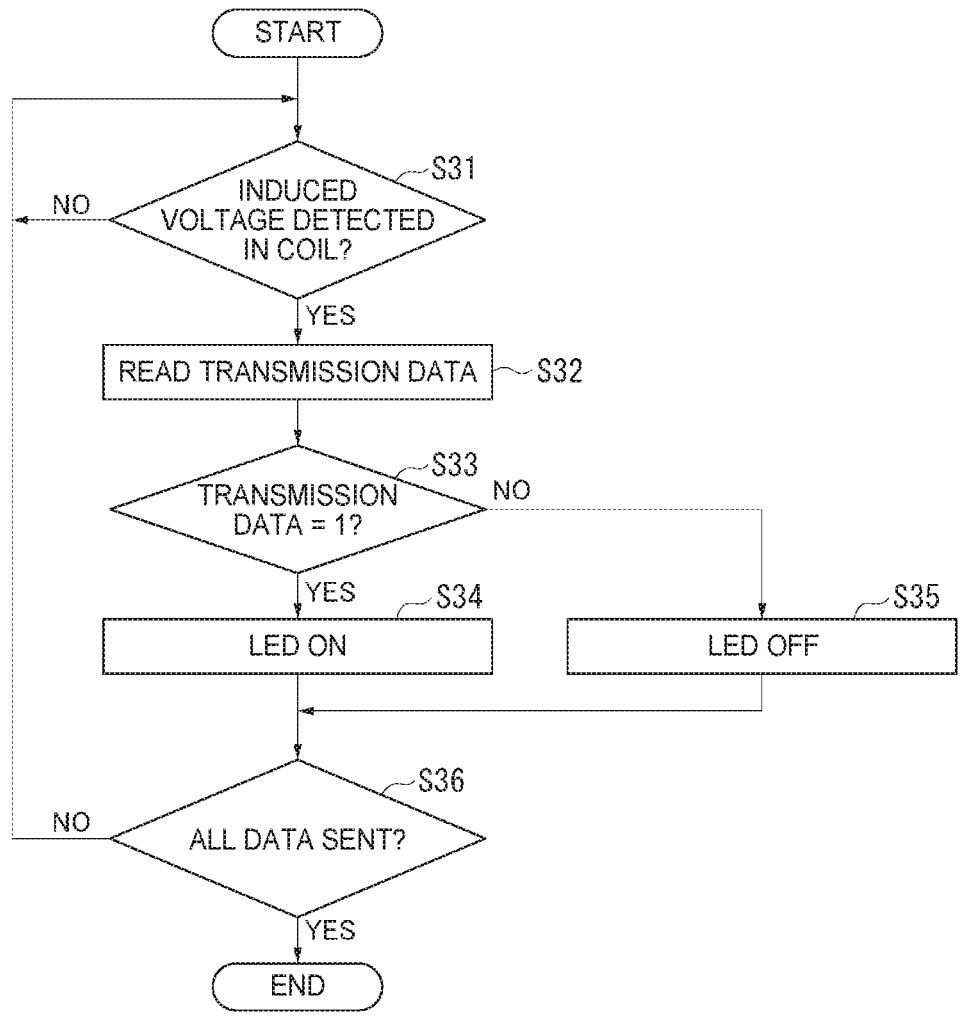
FIG. 17 is a flow chart of the communication process of the communication device in the first embodiment.

The voltage detection circuit 67 detects whether or not current (a pulse) was produced in the coil 55 by electromagnetic induction by comparing the induction voltage of the coil 55 with a previously set threshold. More specifically, the voltage detection circuit 67 determines a signal was received if a voltage exceeding the threshold is detected, and outputs the decision to the control circuit 61. The device-side receiver 68 is thus embodied by the coil 55 and voltage detection circuit 67 as shown in FIG. 17.

Light-Emitting Device Drive Circuit

The light-emitting device drive circuit 66 controls driving the light-emitting device 56 as controlled by the control circuit 61, transmits a 1 signal by causing the light-emitting device 56 to emit, and transmits a 0 signal by turning the light-emitting device 56 off. The device-side transmitter 69 is therefore embodied by the light-emitting device drive circuit 66 and light-emitting device 56 as shown in FIG. 15. Note that the 1 signal is an example of a first signal, and the 0 signal is an example of a second signal. Alternatively, the 0 signal may be the first signal, and the 1 signal may be the second signal.

Communication Interface

The communication interface 63 is configured so that it can connect to the Internet or other network, connects to the network as controlled by the control circuit 61, and receives the update data described below from the network. The received update data is stored in the storage 62 by the control circuit 61.

The communication interface 63 is also configured so that it can connect to a personal computer or other electronic device, connects to the electronic device as controlled by the control circuit 61, and receives update data from the electronic device. The received update data is stored in the storage 62 by the control circuit 61.

Input Device

The input device 64 includes button A 571 and button B 572, and outputs an operating signal corresponding to operation of the buttons 571, 572 to the control circuit 61.

Storage Media Reader

The storage media reader 65 is configured to read data stored to storage media such as USB (Universal Serial Bus) memory sticks, SD memory cards, CDs (Compact Disc), and DVDs (Digital Versatile Disk). The storage media reader 65 connects to the storage media as controlled by the control circuit 61, and reads the update data from the stored data. The read update data is stored to the storage 62 by the control circuit 61.

Storage

As shown in FIG. 15, the storage 62 has an update data storage 622.

The update data that is sent as the transmission data to the electronic timepiece 1 is stored in the update data storage 622. The update data may include part or all of the system setting information 221, reception setting information 222, local time information 230, and version information 223 stored to the EEPROM 220 of the electronic timepiece 1.

Control Circuit

The control circuit 61 functions as a device-side communication processor 640 by running programs stored in the storage 62.

The device-side communication processor 640 executes a process to communicate with the electronic timepiece 1. The device-side communication processor 640 includes a device-side reception controller 641 and a device-side transmission controller 642.

The device-side reception controller 641 controls the voltage detection circuit 67 and runs a reception process that receives signals by electromagnetic coupling that are transmitted from the electronic timepiece 1. The device-side transmission controller 642 controls the light-emitting device drive circuit 66 and runs a transmission process that transmits signals by light to the electronic timepiece 1.

The functional parts of the control circuit 61 are described below in the following description of the communication process of the communication device 2.

Communication Process of the Electronic Timepiece

Figure 16:
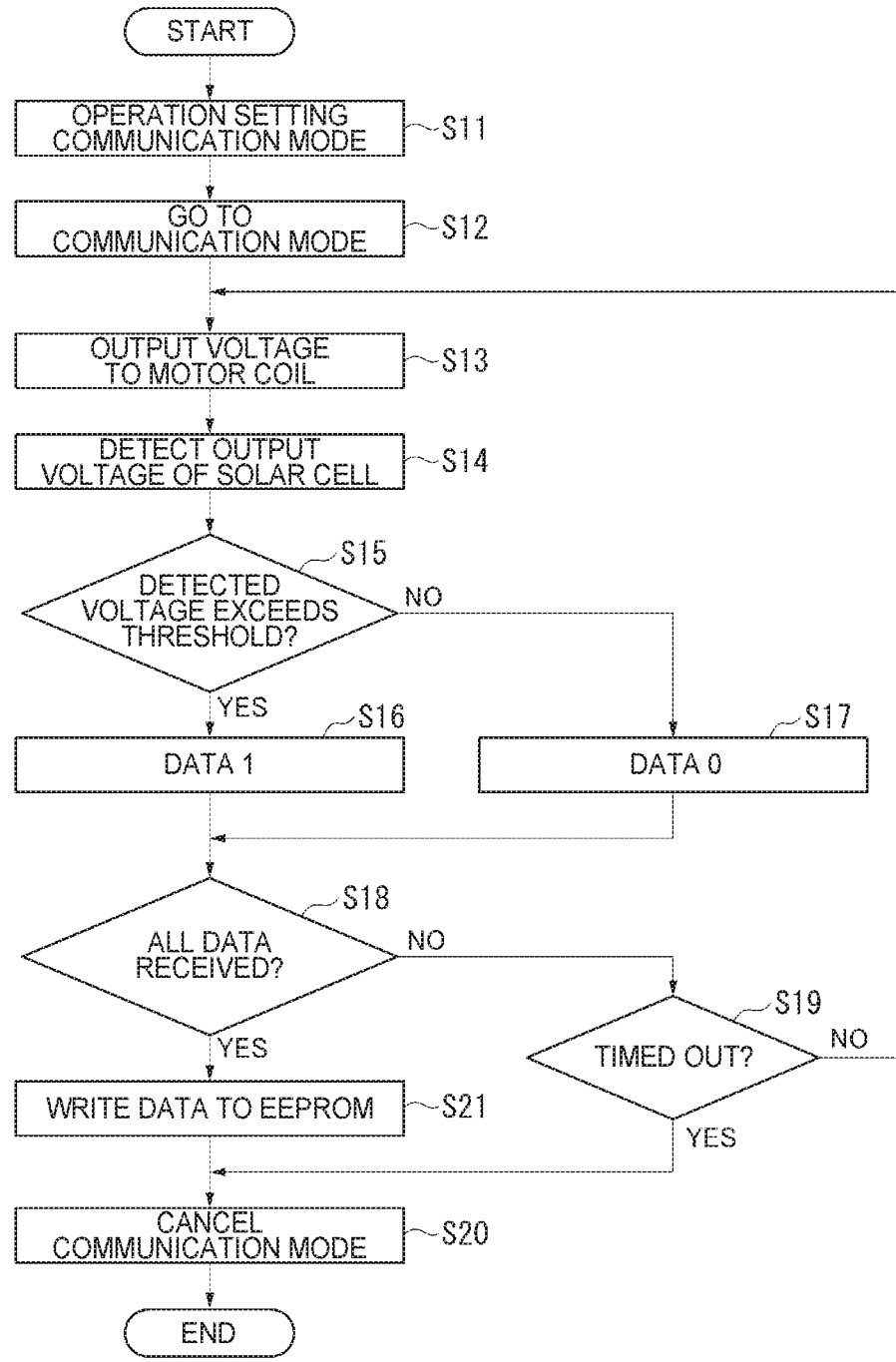
FIG. 16 is a flow chart of the communication process of the electronic timepiece in the first embodiment.

FIG. 16 is a flow chart showing the communication process executed by the electronic timepiece 1.

When the control circuit 300 detects the input device 160 operation that sets the communication mode (S11), it operates the timepiece-side communication processor 340 to set the communication mode of the electronic timepiece 1 (S12).

During normal operation when the communication mode is not active, the charging controller 350 turns the charging control switch 132 on to charge the storage battery 130 with power generated by the solar cell 135 when the voltage detected by the battery voltage detection circuit 134 is less than the threshold; and turns the charging control switch 132 off to stop charging the storage battery 130 from the solar cell 135 when the detected voltage is greater than or equal to the threshold to prevent overcharging the storage battery 130.

Note that the charging controller 350 also turns the charging control switch 132 off during the communication process if the detected voltage is greater than or equal to the threshold.

When the timepiece-side communication processor 340 starts operating, it first starts operating the timepiece-side transmission controller 341.

The timepiece-side transmission controller 341 controls the coil drive circuit 142 of the timepiece-side transmitter 180 to output one pulse to the motor coil 143, that is, outputs a voltage and sends a data request signal requesting transmission of a data signal (S13).

The data signal is a signal train of the update data sent from the communication device 2 one bit at a time, and comprises 1 signals denoting a value of 1, and 0 signals denoting a value of 0.

The timepiece-side communication processor 340 then operates the timepiece-side reception controller 342 after the data request signal is sent by the timepiece-side transmission controller 341.

When the timepiece-side reception controller 342 is operated, the charging controller 350 turns the charging control switch 132 off.

When the timepiece-side reception controller 342 starts operating, it controls the voltage detection circuit 133 of the timepiece-side receiver 170 to detect the output voltage of the solar cell 135 and receive one bit of data (S14).

The timepiece-side reception controller 342 determines if the voltage detection circuit 133 detected a voltage higher than the threshold (S15), determines a 1 signal was received (S16) if a voltage exceeding the threshold was detected by the voltage detection circuit 133 (S15: YES), and outputs the reception result to the timepiece-side communication processor 340. However, if a voltage less than or equal to the threshold was detected by the voltage detection circuit 133 (S15: NO), the timepiece-side reception controller 342 determines a 0 signal was detected (S17), and outputs the reception result to the timepiece-side communication processor 340.

The timepiece-side reception controller 342 also stores the received signal to RAM 210.

After the timepiece-side reception controller 342 has received data, the charging controller 350 turns the charging control switch 132 off if the voltage detected by the battery voltage detection circuit 134 is less than the threshold. The timepiece-side communication processor 340 also determines if all update data sent from the communication device 2 has been received (S18). Note that because the size of the update data, that is, the number of bits, is predetermined, the timepiece-side communication processor 340 can determine if all update data has been received by calculating the size (number of bits) of all data received. The timepiece-side communication processor 340 then outputs the decision to the control circuit 300.

If all update data has not been received by the timepiece-side communication processor 340 (S18: NO), the control circuit 300 determines if the operating time of the timepiece-side communication processor 340 has exceeded a timeout time previously set for the communication process, that is, if the communication process has timed out (S19).

If S19 returns YES, it can be determined that conditions do not enable the data communication process to succeed, and the control circuit 300 therefore stops operation of the timepiece-side communication processor 340 and ends (cancels) the communication mode to prevent further power consumption (S20).

However, if S19 returns NO, the control circuit 300 returns to step S13. The process of steps S13 to S19 therefore repeats unless step S18 returns YES or S19 returns YES.

If all update data has been received by the timepiece-side communication processor 340 (S18: YES), the memory controller 360 writes the received data stored in RAM 210 to EEPROM 220 (S21). The control circuit 300 then stops operation of the timepiece-side communication processor 340 and ends the communication mode (S20).

Communication Process of the Communication Device

FIG. 17 is a flow chart of the communication process run by the communication device 2.

Before communicating with the electronic timepiece 1, the control circuit 61 of the communication device 2 reads the data to update from an external source through the communication interface 63 or storage media reader 65, and stores the update data in the storage 62.

The control circuit 61 then operates the device-side communication processor 640 when it detects that the button A 571 was pressed and the communication operation instructing starting communication with the electronic timepiece 1 was performed.

The device-side communication processor 640 first operates the device-side reception controller 641, and the device-side reception controller 641 controls the voltage detection circuit 67 to detect if the induced voltage produced by the coil 55 exceeds a set threshold, and determines if a data request signal was received by the device-side receiver 68 (S31).

The device-side reception controller 641 repeats the data request signal reception evaluation step S31 until step S31 returns YES.

When the device-side reception controller 641 returns YES in S31, the device-side communication processor 640 operates the device-side transmission controller 642, and the device-side transmission controller 642 reads one bit of data from the update data stored in the update data storage 622 (S32).

The device-side transmission controller 642 then determines if the data signal that was read is a 1 signal (S33).

If S33 returns YES, the device-side transmission controller 642 controls the light-emitting device drive circuit 66 of the device-side transmitter 69 to turn the LED of the light-emitting device 56 on and transmit a 1 signal (S34).

If S33 returns NO, the device-side transmission controller 642 controls the light-emitting device drive circuit 66 to turn the LED of the light-emitting device 56 off and transmit a 0 signal (S35).

Next, the device-side communication processor 640 determines if all update data was transmitted (S36). If S36 returns NO, the device-side communication processor 640 returns to S31. The device-side communication processor 640 then repeats steps S31 to S36 until S36 returns YES.

When S36 returns YES, the control circuit 61 stops operation of the device-side communication processor 640 and ends the communication process.

The signal output timing when transmitting update data is described next.

As shown in FIG. 18A to 18G, when the electronic timepiece 1 outputs a pulse to the motor coil 143 and transmits the data request signal at time T1 (FIG. 18A), a pulse is generated in the coil 55 of the communication device 2 by electromagnetic coupling, and the communication device 2 receives the data request signal (FIG. 18B).

When the data request signal is received, the communication device 2 controls the light-emitting device drive circuit 66 to transmit the update data one bit at a time. More specifically, to transmit a 1 signal as the data signal, the device-side transmission controller 642 controls the light-emitting device drive circuit 66 to turn the light-emitting device 56 on, and to transmit a 0 signal, controls the light-emitting device drive circuit 66 to turn the light-emitting device 56 off (FIG. 18C).

In the example in FIG. 18C, because a 1 signal is output first as the data signal, the device-side transmission controller 642 causes the light-emitting device 56 to turn on and send a 1 signal.

The device-side transmission controller 642 maintains the output state (on or off) of the light-emitting device 56 from time T1 until the next data request signal is received at time T4.

When the light-emitting device 56 is on, the solar cell 135 of the electronic timepiece 1 receives the light emitted from the light-emitting device 56, generates power, and the output voltage of the solar cell 135 rises (FIG. 18F).

The charging controller 350 of the electronic timepiece 1 keeps the charging control switch 132 on for the period (charging period C1) from time T1 to the time T2 when detection of the output voltage of the solar cell 135 by the timepiece-side reception controller 342 starts, unless the voltage detected by the battery voltage detection circuit 134 is greater than or equal to the threshold (FIG. 18D). Because the solar cell 135 is generating power, the power output from the solar cell 135 is supplied to the storage battery 130, and the storage battery 130 is charged.

The timepiece-side reception controller 342 sends an operating pulse to the voltage detection circuit 133 at a voltage detection timing of a constant interval, and the voltage detection circuit 133 operates at the operating pulse input at the voltage detection timing of time T2 (FIG. 18E).

Also at time T2, the charging controller 350 turns the charging control switch 132 off (FIG. 18D). The voltage detection circuit 133 more specifically operates after the charging control switch 132 turns off at time T2 (FIG. 18E). As a result, the voltage detection circuit 133 detects the output voltage of the solar cell 135 without being affected by the voltage of the storage battery 130.

The voltage detection circuit 133 outputs a HIGH signal that is recognized as a 1 signal by the control circuit 300 if the output voltage of the solar cell 135 exceeds a specific threshold (such as 3000 Lx), and outputs a LOW signal that is recognized by the control circuit 300 as a 0 signal if the output voltage of the solar cell 135 is less than or equal to the threshold (FIG. 18G).

In the example in FIG. 18, the output voltage of the solar cell 135 rises after the charging control switch 132 turns off at time T2 (FIG. 18D, 18F). When the output voltage of the solar cell 135 exceeds the threshold, the voltage detection circuit 133 outputs a HIGH signal (FIG. 18G).

Figure 19:
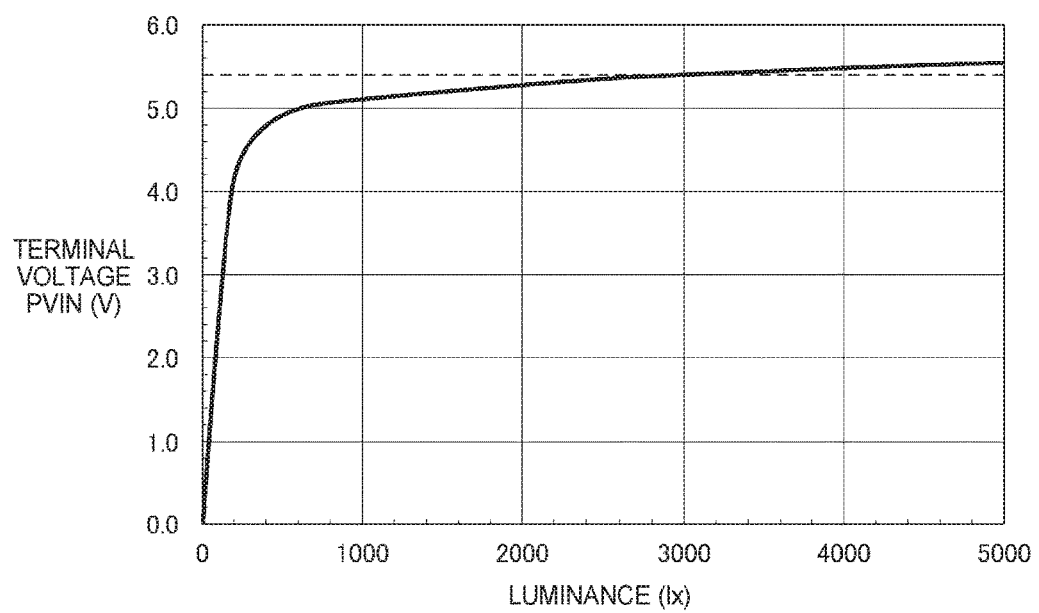
FIG. 19 shows the relationship between the output voltage and the luminance of light incident to the solar cell.

The relationship between the luminance of light incident to the solar cell 135 and the output voltage of the solar cell 135 is expressed by a graph such as shown in FIG. 19. As shown in this graph, because the output voltage increases as the luminance increases, whether the luminance is greater than a specific luminance or is less than or equal to a specific luminance can be determined by determining if the output voltage is greater than a threshold or is less than or equal to the threshold. In the example shown in FIG. 19, the luminance is determined to be greater than 3000 Lx if the output voltage is greater than 5.4 V, and is less than or equal to 3000 Lx if the output voltage is less than or equal to 5.4 V.

The timepiece-side reception controller 342 confirms the evaluation of the received signal at time T3 at the falling edge of the operating pulse. More specifically, the output voltage of the solar cell 135 is detected for the period from time T2 to time T3 (detection period D1).

When evaluation of the received signal is confirmed at time T3, the charging controller 350 turns the charging control switch 132 on if the voltage detected by the battery voltage detection circuit 134 is less than the threshold. Note that in the example in FIG. 18, the output voltage of the solar cell 135 drops after the charging control switch 132 turns on (FIG. 18F).

More specifically, the charging controller 350 keeps the charging control switch 132 off during the detection period D1 (FIG. 18D).

At time T4 at the end of the data request signal transmission interval (1 ms, for example), the timepiece-side transmission controller 341 outputs a pulse to the motor coil 143 to send a data request signal requesting transmission of the next one bit of data (FIG. 18A). The period from time T1 to time T4 is thus equivalent to the reception period allocated to the data signal for one bit. This reception period is equal to the transmission period allocated to the data signal for one bit by the communication device 2.

The charging controller 350 keeps the charging control switch 132 on for the period (charging period C2) from time T3 to time T4 unless the voltage detected by the battery voltage detection circuit 134 is greater than or equal to the threshold (FIG. 18D). Because the solar cell 135 is producing power, the power generated by the solar cell 135 is supplied to the storage battery 130 and the storage battery 130 is charged.

Note that the charging period (C1+C2) and the detection period D1 are both set to approximately half the length of the reception period.

In this way, each time a data request signal is sent from the electronic timepiece 1 to the communication device 2, the update data is sent one bit at a time from the communication device 2 to the electronic timepiece 1.

In the example shown in FIG. 18A-G, when a data request signal is sent from the electronic timepiece 1 at time T4, the communication device 2 turns the light-emitting device 56 off and sends a 0 signal as the data signal (FIG. 18C).

Because the light-emitting device 56 is off, the solar cell 135 of the electronic timepiece 1 does not generate power (FIG. 18G). As a result, the storage battery 130 is not charged for the charging period C1 from time T4 to time T5. The voltage detection circuit 133 also outputs a 0 signal during the detection period D1 from time T5 to time T6. The storage battery 130 is also not charged in the charging period C2 from time T6 to time T7.

The storage battery 130 of the electronic timepiece 1 is thus charged in charging periods C1 and C2 when the transmitted data signal is a 1 signal. When the transmitted data signal is a 0 signal, the storage battery 130 is not charged in charging periods C1 and C2.

When the communication process ends, the control circuit 300 of the electronic timepiece 1 outputs a movement pulse to the motor coil 143, and quickly moves the hands, which were stopped during the communication process, to display the current time.

Operating Effect of Embodiment 1

Because the solar cell 135 and the storage battery 130 are disconnected during the detection period D1 of the communication process, the voltage detection circuit 133 can detect the output voltage of the solar cell 135 without being affected by the voltage of the storage battery 130. As a result, the voltage detection circuit 133 can correctly receive data signals.

Because the solar cell 135 and storage battery 130 are connected during the charging periods C1, C2, the storage battery 130 is charged by the power output from the solar cell 135 when a 1 signal is transmitted from the communication device 2. As a result, a drop in the battery capacity caused by the communication process can be suppressed.

Because the charging control switch 132 turns off if the storage battery 130 is charged to capacity and the voltage detected by the battery voltage detection circuit 134 is greater than or equal to the threshold during the charging periods C1, C2, the storage battery 130 is not charged even if the solar cell 135 is exposed to light. Overcharging can thus be prevented.

The evaluation process can also be simplified because the electronic timepiece 1 detects 1 signals and 0 signals by determining if the solar cell 135 is exposed to light based on the voltage detected by the voltage detection circuit 133.

When a motor used in the timepiece is changed, the waveform of the motor drive pulses used to drive the motor must be changed. Parameters that may be changed are therefore generally stored in rewritable nonvolatile memory.

The communication system 10 also sends parameters such as rate information, stepper motor drive settings, the automatic satellite signal reception interval of the reception process, and the timeout time from the communication device 2 to the electronic timepiece 1. As a result, parameters that are stored in EEPROM 220, which is nonvolatile memory, can also be rewritten.

Because the storage capacity of nonvolatile memory devices has increased greatly, nonvolatile memory can now be used to store the program that controls operation of the timepiece.

The communication system 10 also sends the program for operating the electronic timepiece 1 as update data from the communication device 2 to the electronic timepiece 1. As a result, the program stored in EEPROM 220 can also be rewritten.

Keeping the local time information storing the time zone information and daylight saving time information updated to the most recent information is also particularly desirable in timepieces with a GPS receiver. As a result, the local time information is also stored in rewritable nonvolatile memory.

When time zone settings or daylight saving time settings change, the communication system 10 also sends the time zone information and daylight saving time information as update data from the communication device 2 to the electronic timepiece 1. As a result, the local time information stored in EEPROM 220 can also be rewritten.

Because the communication device 2 and electronic timepiece 1 communicate wirelessly, the operator does not need to remove the back cover of the timepiece and remove the circuit board on which the nonvolatile memory is mounted from the case in order to rewrite data in the EEPROM 220. The operator therefore does not need to go to the trouble of removing the circuit board from the case. The operator also does not need to remove dust or other foreign matter that may get into the case while the case is open, and does not need to test for water resistance after the back cover is replaced.

Embodiment 2

Figure 20:
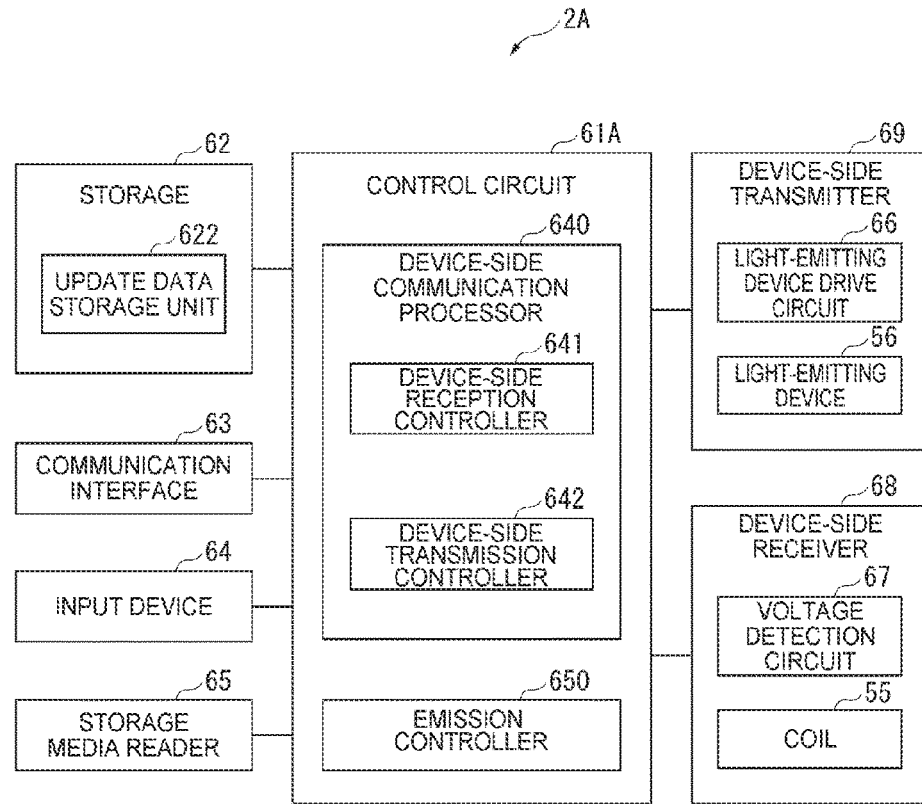
FIG. 20 is a control block diagram of the communication device in a second embodiment.

A communication system according to a second embodiment differs from the first embodiment in that the communication device 2A causes the light-emitting device 56 to emit at a first luminance when the data signal is a 1 signal, and causes the light-emitting device 56 to emit at a second luminance when the data signal is a 0 signal. As shown in FIG. 20, this second embodiment also differs from the first embodiment in that the control circuit 61A of the communication device 2A has an emission controller 650 that controls the light-emitting device 56 to emit and charge the storage battery 130 of the electronic timepiece 1 except when transmitting a data signal. In this embodiment, the emission controller 650 causes the light-emitting device 56 to emit before transmission of update data starts and after all update data has been transmitted. Other aspects of the configuration of the second embodiment are the same as in the first embodiment.

Figure 21:
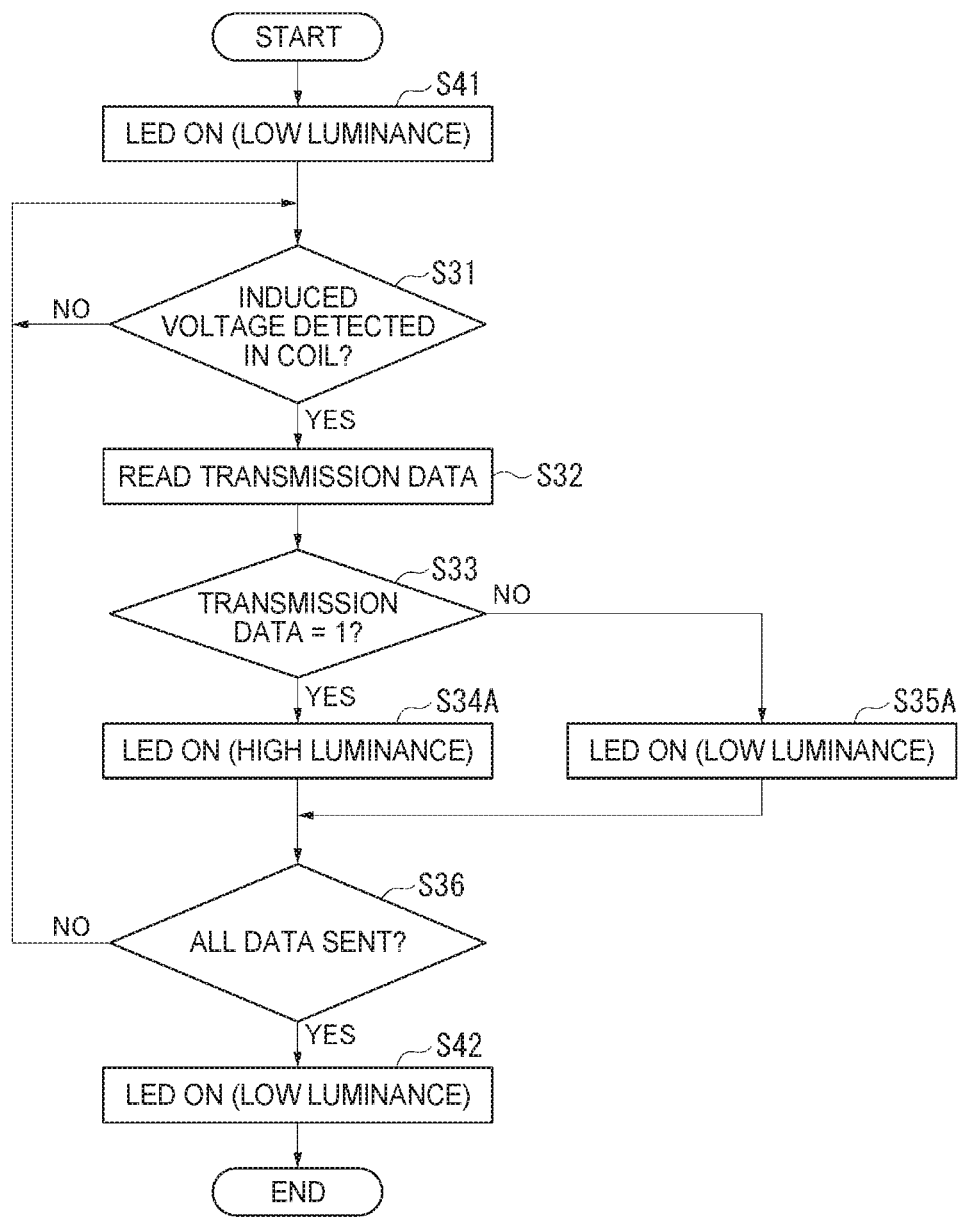
FIG. 21 is a flow chart of the communication process of the communication device in the second embodiment.

FIG. 21 is a flow chart of the communication process executed by the communication device 2A.

The communication device 2A executes steps S31-S33, S34A, S35A, S36, S41, S42. Steps S31-S33, S36 are the same as in the first embodiment, and further description thereof is omitted.

When the user presses button A 571 to start the communication process in the communication process of the second embodiment, the emission controller 650 controls the light-emitting device drive circuit 66 to drive the LED of the light-emitting device 56 at a low luminance setting so that the solar cell 135 of the electronic timepiece 1 can be charged in a low power mode before the device-side reception controller 641 detects the induced voltage of the coil 55 in S31. As a result, the solar cell 135 of the electronic timepiece 1 is exposed to low luminance light (such as 1000 Lx) and generates power (S41). Note that the communication device 2A has a detection means for detecting if an electronic timepiece 1 was set on the stand 53, and the emission controller 650 may drive the LED of the light-emitting device 56 to light when it is detected that the user has placed an electronic timepiece 1 on the stand 53.

The emission controller 650 then drives the light-emitting device 56 continuously to emit at the low luminance level until the induced voltage produced in the coil 55 is detected and S31 returns YES.

Because the charging control switch 132 turns on if the voltage detected by the battery voltage detection circuit 134 is less than the threshold during this time, the storage battery 130 of the electronic timepiece 1 is charged by the power generated by the solar cell 135.

When the data signal read from the update data is a 1 signal and S33 returns YES, the device-side transmission controller 642 controls the light-emitting device drive circuit 66 to drive the LED of the light-emitting device 56 at a first luminance (high luminance) setting and transmit a 1 signal. As a result, the solar cell 135 of the electronic timepiece 1 is exposed to high luminance light (such as 5000 Lx) and generates power (S34A). The first luminance is set so that the solar cell 135 will generate power and charge the storage battery 130, and the output voltage of the solar cell 135 will exceed a threshold voltage (such as 5.4 V) used for signal evaluation as a result of the solar cell 135 of the electronic timepiece 1 receiving light from the light-emitting device 56. Note that this first luminance is the same as the luminance of the light-emitting device 56 when transmitting a 1 signal in the first embodiment.

When the data signal read from the update data is a 0 signal and S33 returns NO, the device-side transmission controller 642 controls the light-emitting device drive circuit 66 to drive the LED of the light-emitting device 56 at a second luminance (low luminance) setting, which is lower than the first luminance of the LED of the light-emitting device 56, and transmit a 0 signal. As a result, the solar cell 135 of the electronic timepiece 1 is exposed to low luminance light (such as 1000 Lx) (S35A). The second luminance is set so that the solar cell 135 will generate power and charge the storage battery 130, and the output voltage of the solar cell 135 is less than or equal to the threshold voltage (such as 5.4 V) used for signal evaluation as a result of the solar cell 135 of the electronic timepiece 1 receiving light from the light-emitting device 56. Note that this second luminance may be the same or different from the luminance of the light-emitting device 56 in S41.

When all update data has been transmitted and S36 returns YES, the emission controller 650 controls the light-emitting device drive circuit 66 so that the solar cell 135 of the electronic timepiece 1 can be charged in a low power mode, and drives the LED of the light-emitting device 56 to light at a low luminance level for a specific time. As a result, the solar cell 135 of the electronic timepiece 1 is exposed to low luminance light (such as 1000 Lx) and generates power (S42).

Because the charging control switch 132 of the electronic timepiece 1 is on when the voltage detected by the battery voltage detection circuit 134 is less than the threshold, the storage battery 130 is charged by the power produced by the solar cell 135.

When the specific time has past, the control circuit 61 ends the communication process and the emission controller 650 turns the LED of the light-emitting device 56 off. The emission controller 650 may also turn the LED of the light-emitting device 56 off when it is detected that the electronic timepiece 1 was removed from the stand 53.

Note that, as in the first embodiment, the timepiece-side reception controller 342 of the electronic timepiece 1 in this embodiment can determine if the data signal is a 1 signal or a 0 signal by determining if the output voltage of the solar cell 135 is greater than or is less than or equal to a threshold (such as 5.4 V).

FIG. 22A to 22G illustrate the signal output timing during update data transmission in this embodiment.

In this embodiment, the solar cell 135 of the electronic timepiece 1 is exposed to light and produces power, and outputs a voltage capable of charging the storage battery 130 (FIG. 22F), even when a 0 signal is transmitted as the data signal (FIG. 22C).

As a result, as shown in FIG. 22A to 22G, the storage battery 130 is charged by the power generated by the solar cell 135 even in the charging periods C1, C2 of the reception period from time T4 to time T7 when a 0 signal is transmitted (FIG. 22F).

More specifically, the storage battery 130 is charged by power generated by the solar cell 135 in the charging periods C1, C2 of both reception periods, the reception period when a 1 signal is received and the reception period when a 0 signal is received (FIG. 22F).

Operating Effect of Embodiment 2

Because light is emitted to the solar cell 135 whether the data signal is a 1 signal or a 0 signal, the storage battery 130 can be charged more than if the solar cell 135 is exposed to light only when the data signal is a 1 signal.

Because the storage battery 130 can be charged before receiving update data starts in this electronic timepiece 1, the battery capacity can be prevented from dropping while update data is being received, and the reception process can be executed reliably.

Furthermore, because the storage battery 130 can be charged after the reception process ends if the battery capacity drops as a result of the update data reception process, the battery capacity can be restored. As a result, there is no need to separately charge the electronic timepiece 1 after the reception process, and the convenience of the electronic timepiece 1 can be improved.

Embodiment 3

A communication system according to a third embodiment differs from the first embodiment in that the memory controller 360 of the electronic timepiece writes one block of data signals to the EEPROM 220 once data signals for one block have been received. The control circuit of the communication device also differs from the first embodiment in having the same emission controller 650 as the second embodiment that causes the light-emitting device 56 when not transmitting data signals. The emission controller 650 in this embodiment causes the light-emitting device 56 to emit while writing one block of data signals to EEPROM 220. Other aspects of this embodiment are the same as in the first embodiment.

Figure 23:
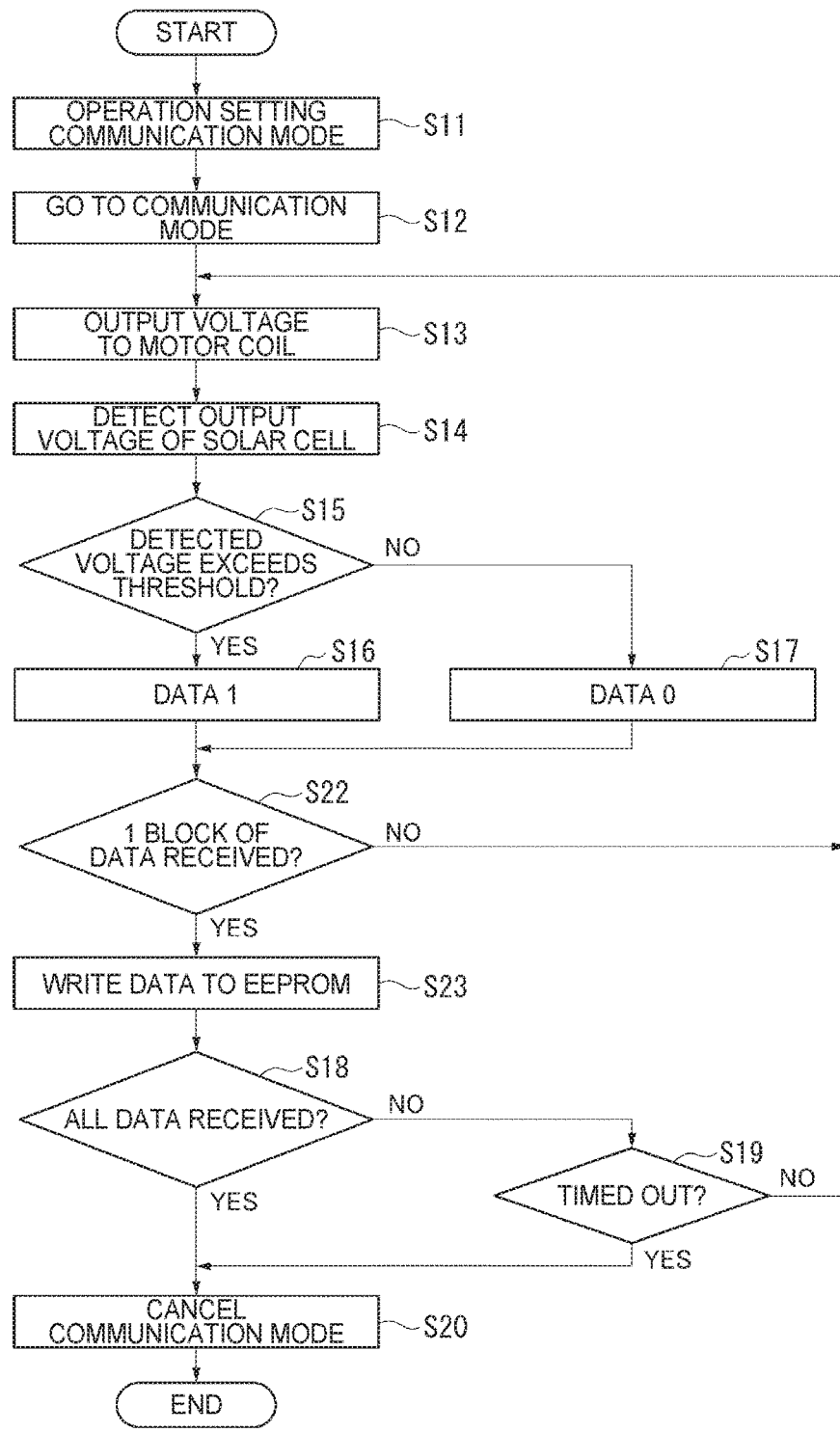
FIG. 23 is a flow chart of the communication process of the electronic timepiece in a third embodiment.

FIG. 23 is a flow chart of the communication process executed by the electronic timepiece according to the third embodiment.

The electronic timepiece executes a process of steps S11 to S20, S22, and S23. Because steps S11 to S20 are the same as in the first embodiment, further description thereof is omitted.

In the communication process of the third embodiment, a data signal is received in step S16 or S17 and stored to RAM 210, and the timepiece-side communication processor 340 then determines if a one-block portion of the update data sent from the communication device 2 was received (S22). One block in this example is the unit for writing data to the EEPROM 220, and is predetermined by the specifications of the EEPROM 220. One block may be 1 byte or 128 bytes, for example. One block may also be the size of the unit in which data is temporarily stored to RAM 210, or an amount of data that is convenient for communication.

If S22 returns NO, the control circuit 300 returns to step S13.

However, if S22 returns YES, the charging controller 350 turns the charging control switch 132 on if the voltage detected by the battery voltage detection circuit 134 is less than the threshold.

The memory controller 360 then writes the one block of data that was received to EEPROM 220 (S23). Then in S18, the timepiece-side communication processor 340 determines if all update data has been received. If S18 returns YES, the control circuit 300 stops operation of the timepiece-side communication processor 340 and ends the communication mode (S20).

In this embodiment, the period after S22 returns YES until step S23 executes, S18 returns NO, S19 returns NO, and a data request signal is transmitted in S13 is a reception pause in which reception is stopped. Note that the communication device also stops transmitting update data during this period.

Figure 24:
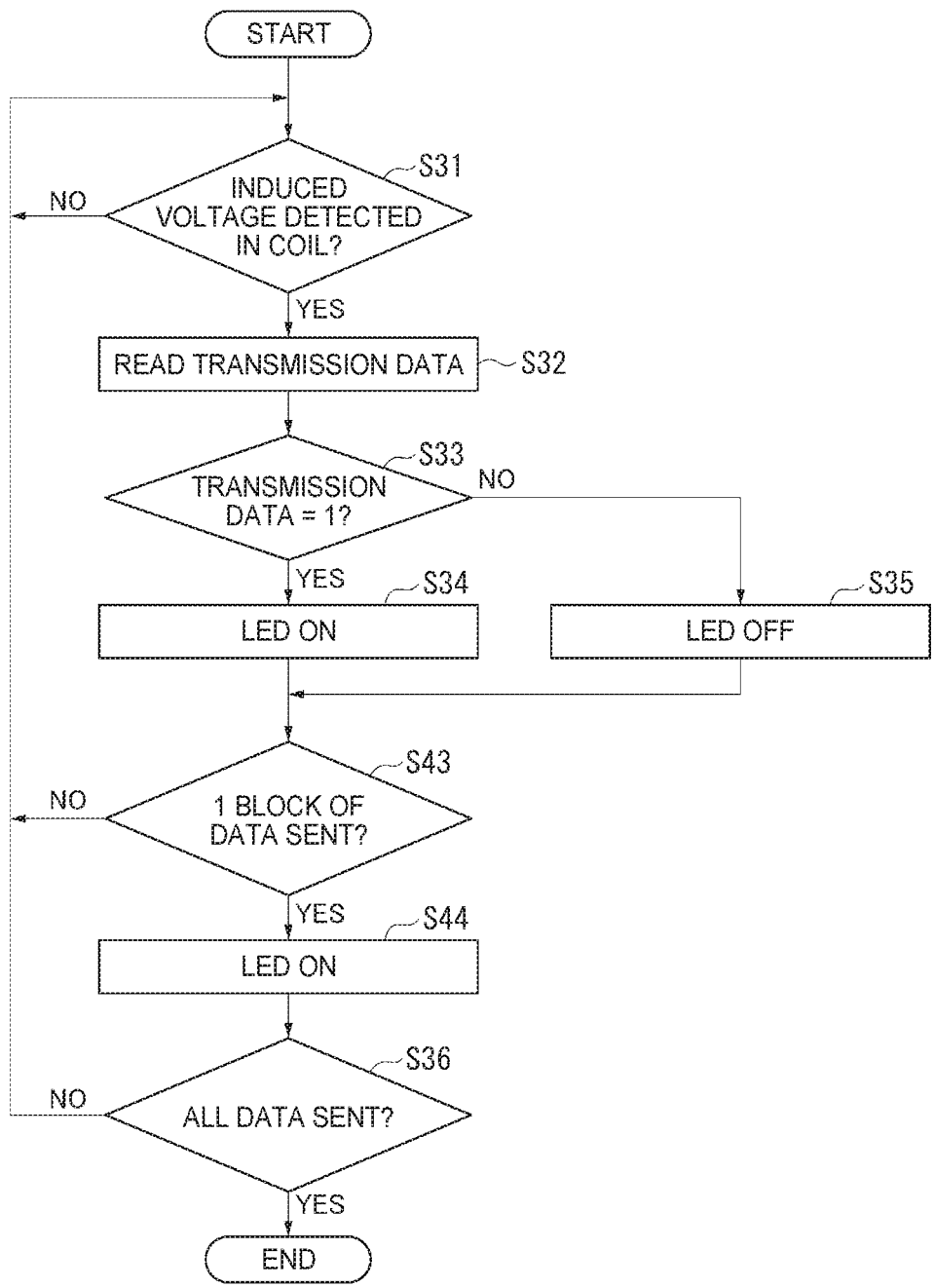
FIG. 24 is a flow chart of the communication process of the communication device in the third embodiment.

FIG. 24 is a flow chart of the communication process executed by the communication device in a third embodiment.

The communication device executes S31-S36, S43, S44. Steps S31-S36 are the same as in the first embodiment, and further description thereof is omitted.

After a data signal is transmitted in S34 or S35 in the communication process of the third embodiment, the device-side transmission controller 642 determines if one block of update data has been transmitted (S43). If S43 returns NO, the control circuit 300 returns to S31.

However, if S43 returns YES, the emission controller 650 controls the light-emitting device drive circuit 66 to turn the LED of the light-emitting device 56 on (S44).

Then in S36, the device-side communication processor 640 determines if all update data was transmitted.

If S36 returns NO, the device-side communication processor 640 returns to S31.

As a result, the data write process of the electronic timepiece (S23) ends after the light-emitting device 56 turns on in S44, and the light-emitting device 56 emits continuously until the next data request signal is transmitted from the electronic timepiece.

During this time, the solar cell 135 of the electronic timepiece receives the light emitted by the light-emitting device 56 and generates power. Because the charging control switch 132 turns on if the voltage detected by the battery voltage detection circuit 134 is less than the threshold, the storage battery 130 is charged by the power output from the solar cell 135.

If S36 returns YES, the control circuit 61 ends operation of the device-side communication processor 640 and ends the communication process.

Operating Effect of Embodiment 3

This embodiment can charge the storage battery 130 while the memory controller 360 stores one block of data signals that was received to EEPROM 220, and can suppress a drop in battery capacity caused by the communication process.

Embodiment 4

A communication system according to a fourth embodiment differs from the first embodiment in that a configuration process that sets the method of evaluating data signals is negotiated between the communication device and the electronic timepiece before transmission of update data starts. Other aspects of this embodiment are the same as in the first embodiment.

Figure 25:
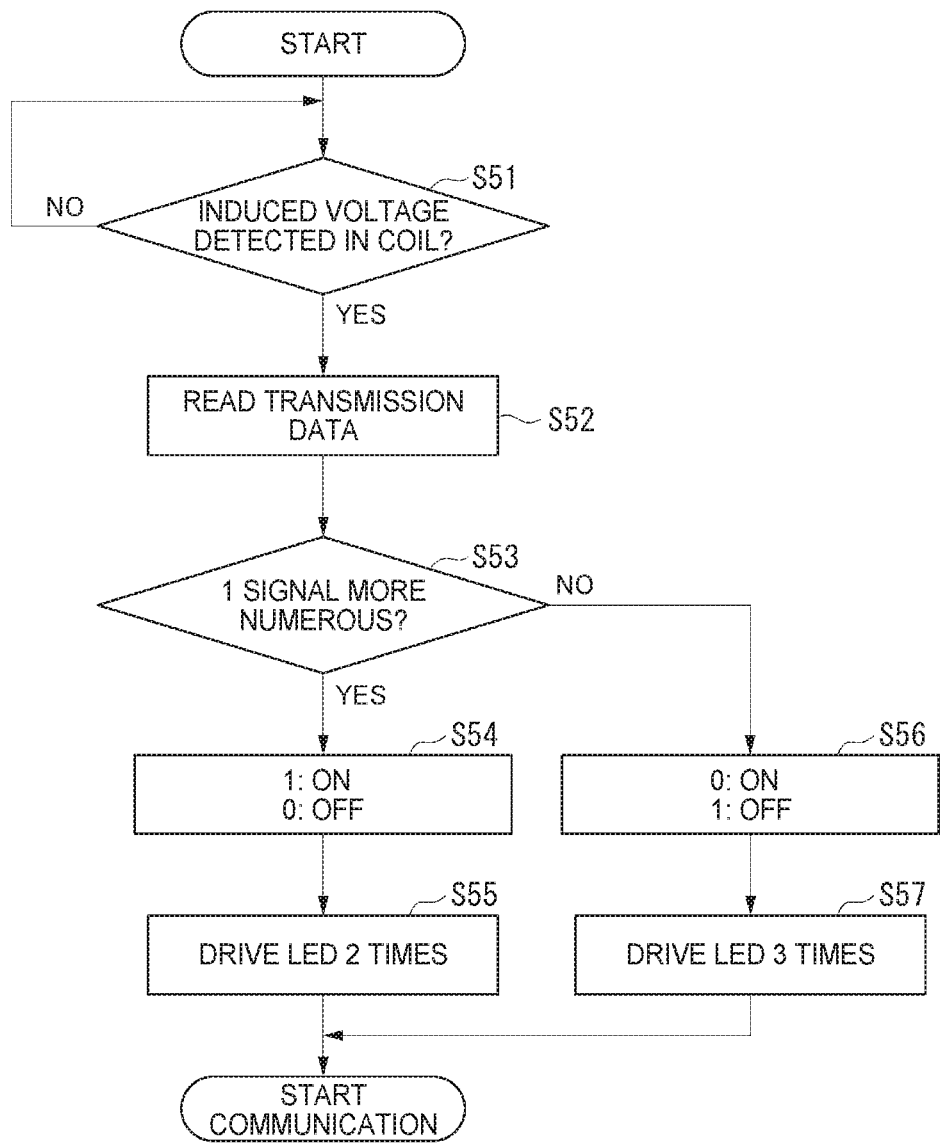
FIG. 25 is a flow chart of the configuration process of the communication device in the fourth embodiment.

FIG. 25 is a flow chart of the configuration process run by the communication device in the fourth embodiment.

The control circuit 61 of the communication device operates the device-side communication processor 640 when it detects that the button A 571 was pressed and the communication operation instructing starting communication with the electronic timepiece 1 was performed.

The device-side communication processor 640 first operates the device-side reception controller 641, and the device-side reception controller 641 controls the voltage detection circuit 67 to detect if the induced voltage produced by the coil 55 is greater than or equal to a set threshold, and determines if a configuration request signal requesting setting the signal evaluation method was received (S51).

The device-side reception controller 641 continues the reception evaluation process S51 of the configuration request signal until S51 returns YES.

If the device-side reception controller 641 decides YES in S51, the device-side communication processor 640 operates the device-side transmission controller 642 and the device-side transmission controller 642 reads all data signals of the update data stored in the update data storage 622 (S52).

The device-side transmission controller 642 then counts the number of 1 signals and the number of 0 signals contained in all of the data signals that were read. The device-side transmission controller 642 then determines if the number of 1 signals is greater than the number of 0 signals (S53). Note that this step S53 is an evaluation process.

If S53 returns YES, the device-side transmission controller 642 turns the light-emitting device 56 on to transmit a 1 signal, and turns the light-emitting device 56 off to transmit a 0 signal (S54).

The device-side transmission controller 642 then controls the light-emitting device drive circuit 66 to turn the LED of the light-emitting device 56 on twice, for example, to transmit the result of S53 (S55).

Using the data signal transmission method set in S54, the device-side communication processor 640 then starts the communication process that transmits update data using the same process described in the first embodiment.

If S53 returns NO, the device-side transmission controller 642 turns the light-emitting device 56 on to transmit a 0 signal, and turns the light-emitting device 56 off to transmit a 1 signal (S56).

The device-side transmission controller 642 then controls the light-emitting device drive circuit 66 to turn the LED of the light-emitting device 56 on three times, for example, to transmit the result of S53 (S57).

Using the data signal transmission method set in S56, the device-side communication processor 640 then starts the communication process that transmits update data using the same process described in the first embodiment.

Figure 26:
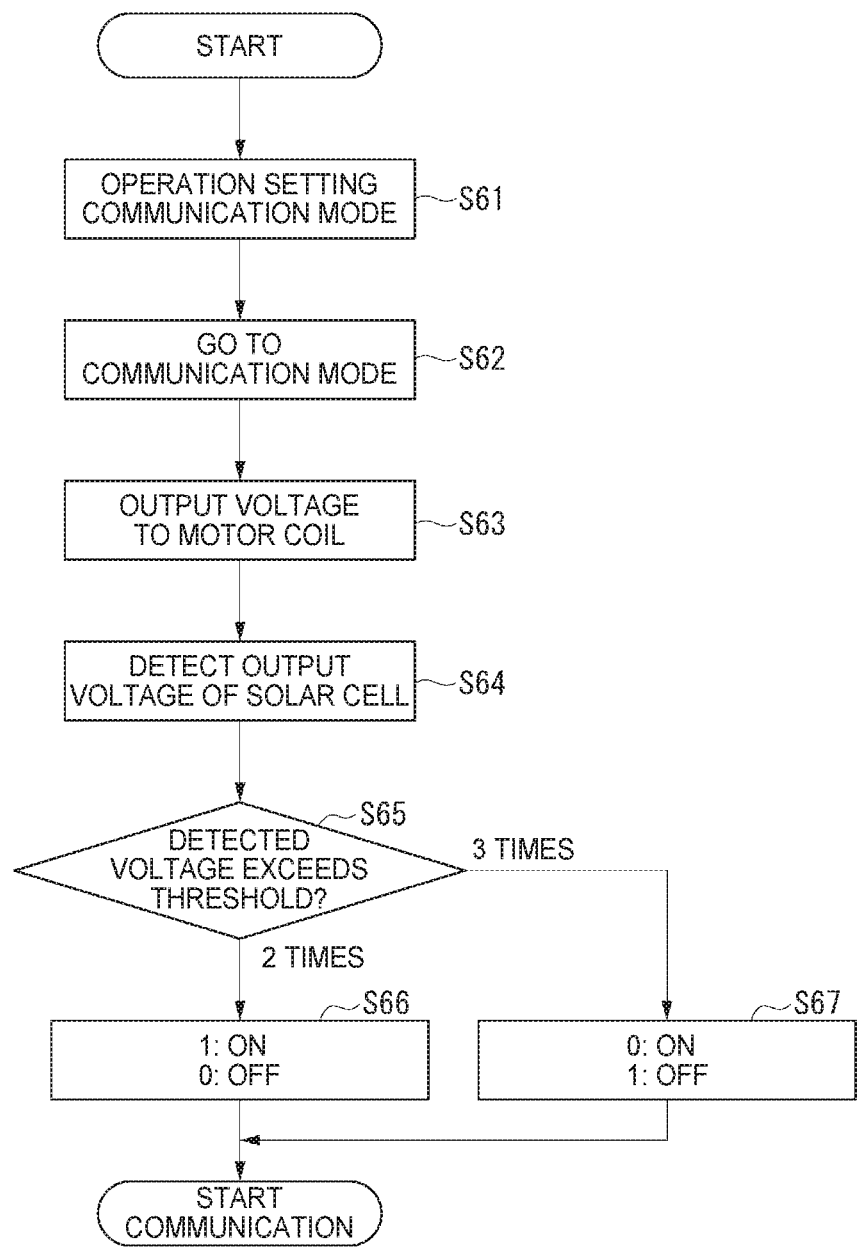
FIG. 26 is a flow chart of the configuration process of the electronic timepiece in the fourth embodiment.

FIG. 26 is a flow chart of the configuration process executed by the electronic timepiece in the fourth embodiment.

When the control circuit 300 of the electronic timepiece detects the operation of the input device 160 setting the communication mode (S61), it operates the timepiece-side communication processor 340 to set the electronic timepiece 1 to the communication mode (S62).

When the timepiece-side communication processor 340 starts operating, it operates the timepiece-side transmission controller 341. The timepiece-side transmission controller 341 controls the coil drive circuit 142 to output one pulse to the motor coil 143, that is, outputs a voltage and sends a configuration request signal (S63).

The timepiece-side communication processor 340 then operates the timepiece-side reception controller 342 after the configuration request signal is sent by the timepiece-side transmission controller 341. When the timepiece-side reception controller 342 starts operating, it controls the voltage detection circuit 133 to detect the output voltage of the solar cell 135 (S64). The timepiece-side reception controller 342 determines the number of times the voltage detection circuit 133 detected a voltage higher than the threshold (S65).

If the result of S65 is two, the timepiece-side reception controller 342 determines a 1 signal was received if the light-emitting device 56 turns on and the voltage detected by the voltage detection circuit 133 exceeds the threshold, and determines a 0 signal was received if the light-emitting device 56 turns off and the voltage detected by the voltage detection circuit 133 is less than or equal to the threshold (S66).

The timepiece-side communication processor 340 then starts the communication process to receive update data using the same process described in the first embodiment according to the data signal evaluation method set in S66.

If the result of S65 is three, the timepiece-side reception controller 342 determines a 1 signal was received if the light-emitting device 56 turns off and the voltage detected by the voltage detection circuit 133 is less than or equal to the threshold, and determines a 0 signal was received if the light-emitting device 56 turns on and the voltage detected by the voltage detection circuit 133 is greater than the threshold (S67).

The timepiece-side communication processor 340 then starts the communication process to receive update data using the same process described in the first embodiment according to the data signal evaluation method set in S67.

Operating Effect of Embodiment 4

Because the device-side transmission controller 642 turns the light-emitting device 56 on when transmitting the data signals of the more numerous 1 signals and 0 signals contained in the update data, the time that the solar cell 135 of the electronic timepiece is exposed to light is longer during the transmission of all update data than if the light-emitting device 56 is one when transmitting the less numerous data signals. The storage battery 130 can therefore be charged more.

Embodiment 5

An electronic timepiece 1A according to a fifth embodiment is a solar-powered wristwatch without the ability to receive satellite signals from GPS satellites.

Figure 27:
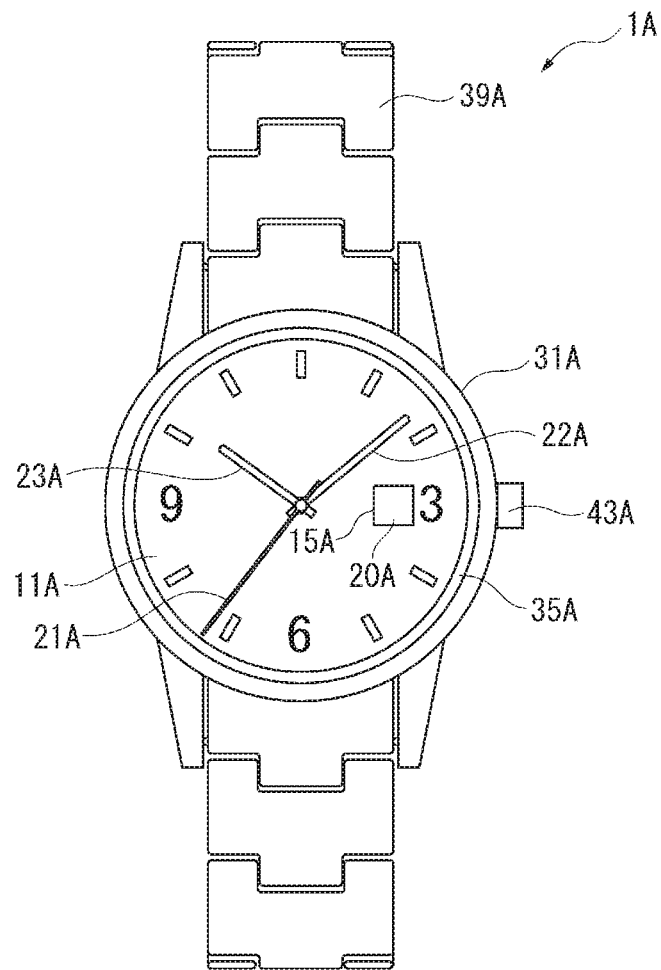
FIG. 27 is a plan view of an electronic timepiece according to a fifth embodiment.
Figure 28:
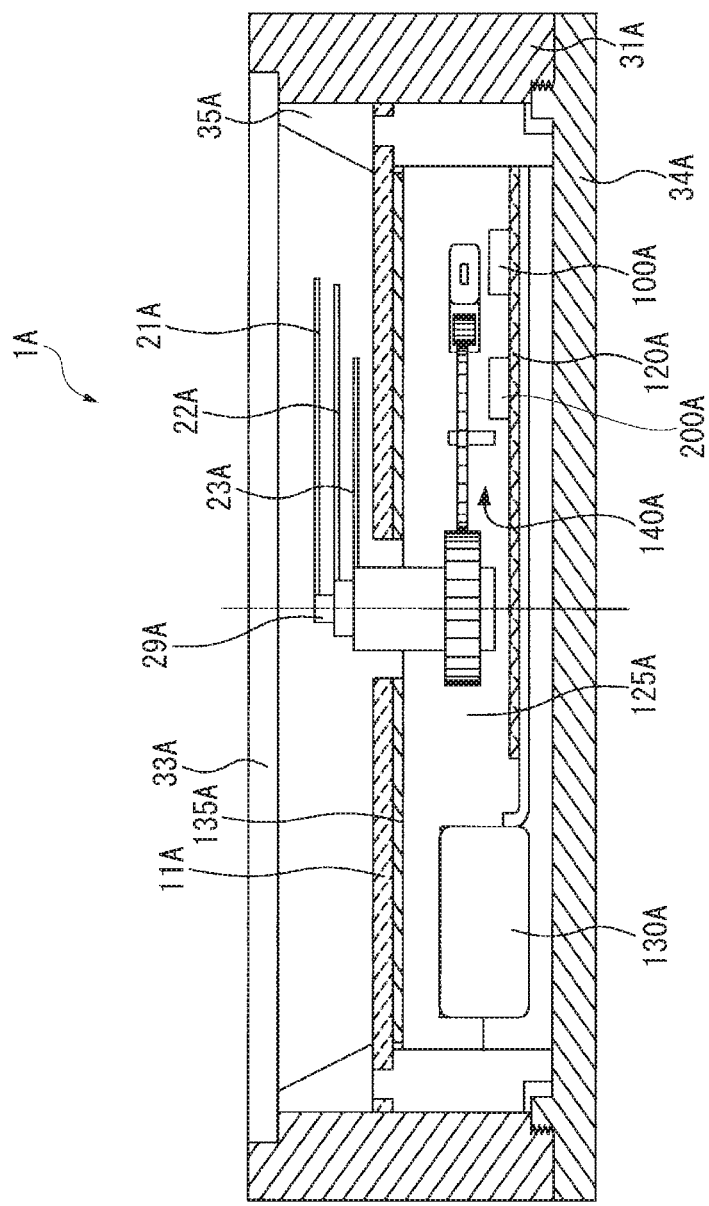
FIG. 28 is a section view of the according to the fifth embodiment.

FIG. 27 shows the face of the electronic timepiece 1A, and FIG. 28 is a section view of the electronic timepiece 1A.

As shown in FIG. 27 and FIG. 28, the electronic timepiece 1A has a case member 31A to which a band 39A is attached, a crystal 33A, and a back cover 34A. A crown 43A is disposed on the side of the case member 31A.

As shown in FIG. 28, a dial ring 35A, dial 11A, hands 21A (secondhand), 22A (minute hand), and 23A (hour hand), date indicator 20A, and a drive mechanism 140A that drives the hands and date indicator 20A are disposed inside the case member 31A.

A solar cell 135A is disposed between the dial 11A and the main plate 125A to which the drive mechanism 140A is attached. Through-holes through which the center arbor 29A of the hands 21A, 22A, 23A, and an aperture for the date window 15A, are formed in the dial 11A, solar cell 135A, and main plate 125A.

The drive mechanism 140A is disposed to the main plate 125A, and is covered by a circuit board 120A from the back side. The drive mechanism 140A includes a stepper motor and wheel train, and drives the hands by the stepper motor rotationally driving the pivots through the wheel train.

The drive mechanism 140A more specifically includes first to third drive mechanisms. The first drive mechanism drives the minute hand 22A and hour hand 23A; the second drive mechanism drives the second hand 21A; and the third drive mechanism drives the date indicator 20A.

The circuit board 120A has a control device 100A, and a storage 200A. A storage battery 130A is disposed between the main plate 125A and the back cover 34A.

Figure 29:
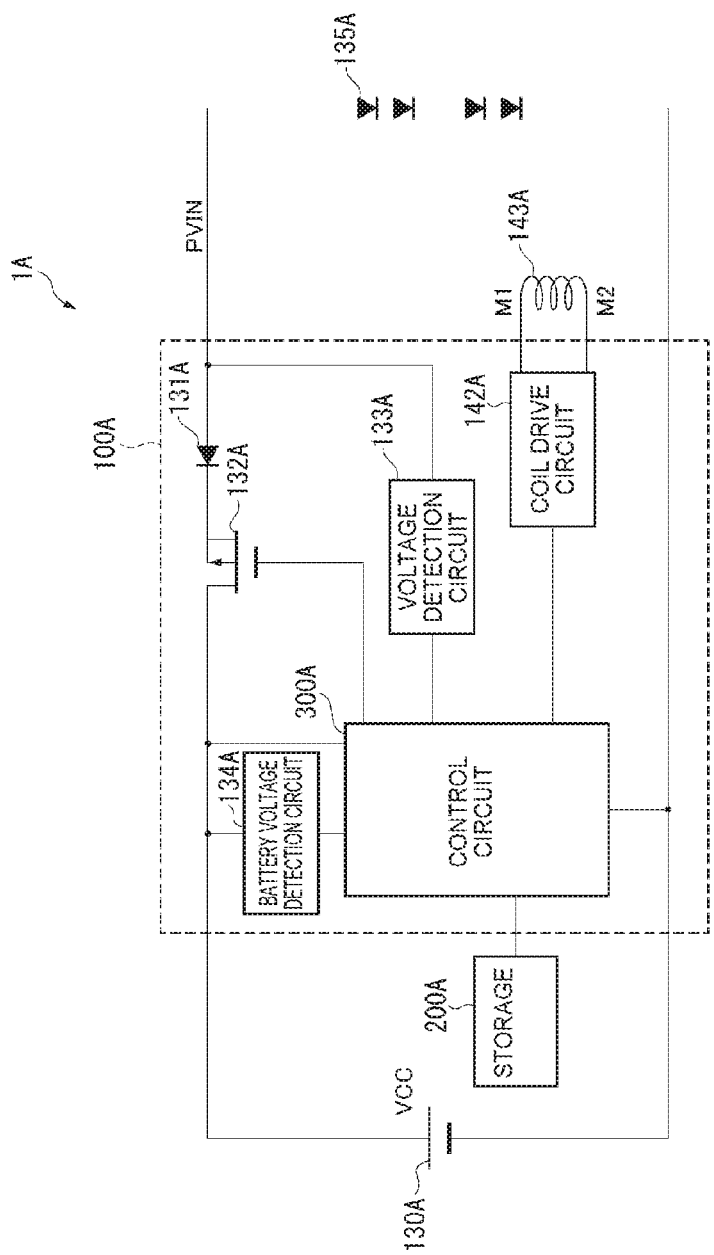
FIG. 29 is a circuit diagram of the electronic timepiece according to the fifth embodiment.

FIG. 29 is a circuit diagram of the electronic timepiece 1A.

Like the electronic timepiece 1 according to the first embodiment, this electronic timepiece 1A has a control circuit 300A, storage 200A, a storage battery 130A as a rechargeable power supply, a solar cell 135A, a diode 131A, a charging control switch 132A, a voltage detection circuit 133A, a battery voltage detection circuit 134A, a motor coil 143A, and the coil drive circuit 142A.

The control circuit 300A, diode 131A, charging control switch 132A, voltage detection circuit 133A, battery voltage detection circuit 134A, and coil drive circuit 142A embody the control device 100A.

The control circuit 300A does not have the ability to receive satellite signals from GPS satellites, or to correct the internal time based on received time information or positioning information calculated from received satellite signals, but otherwise functions identically to the control circuit 300 of the first embodiment. More specifically, the control circuit 300A has a timepiece-side communication processor, a charging controller, and a memory controller as in the control circuit 300 in the first embodiment.

Parameters such as the rate information and stepper motor drive settings, and programs for controlling operation of the electronic timepiece 1A, are transmitted as update data from the communication device 2 to the electronic timepiece 1A.

The communication system of the fifth embodiment thus comprised has the same operational effect as the first embodiment.

Other Embodiments

The invention is not limited to the embodiments described above, and can be modified and improved in many ways without departing from the scope of the accompanying claims.

The voltage detection circuit that detects the output voltage of the solar cell in the electronic timepieces described above may be a circuit that compares the output voltage of the solar cell with the battery voltage of the storage battery.

Figure 30:
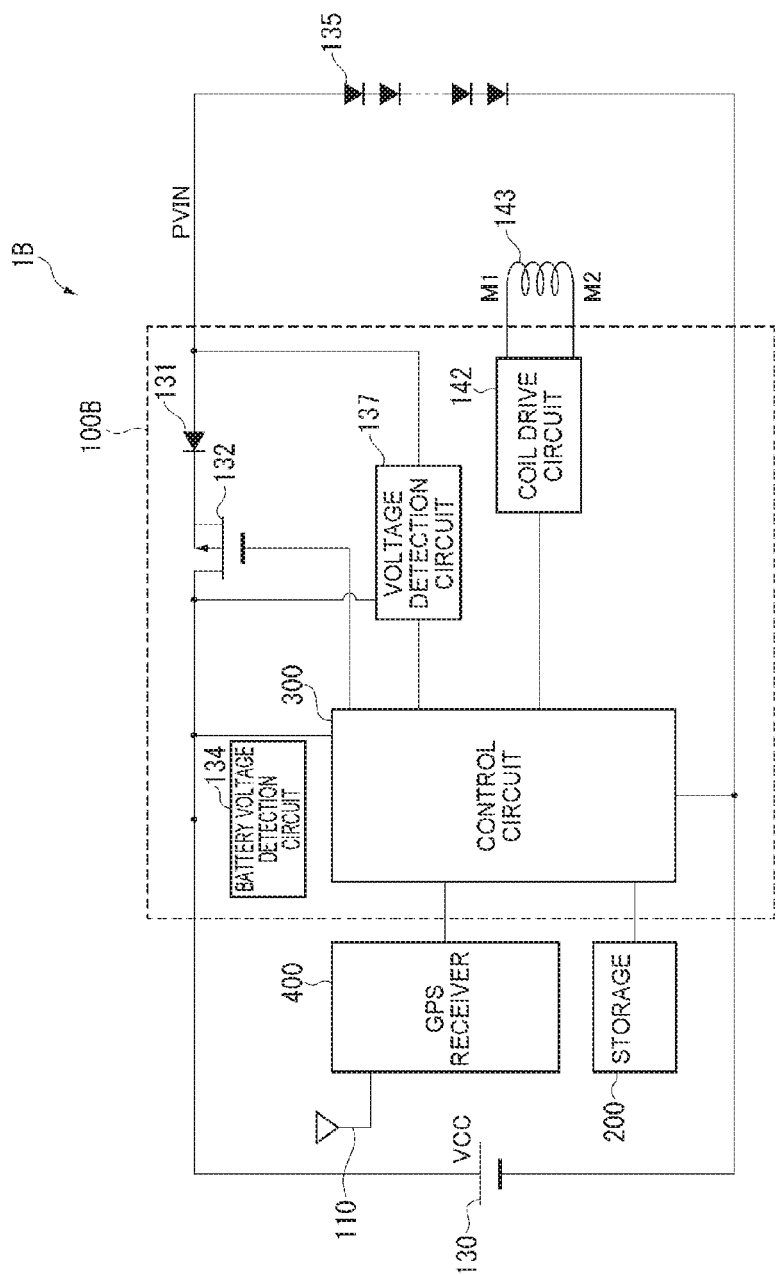
FIG. 30 is a circuit diagram of an electronic timepiece according to another variation.

As shown in FIG. 30, the voltage detection circuit 137 of the control device 100B in an electronic timepiece 1B according to another embodiment is connected to the solar cell 135 and the storage battery 130.

Figure 31:
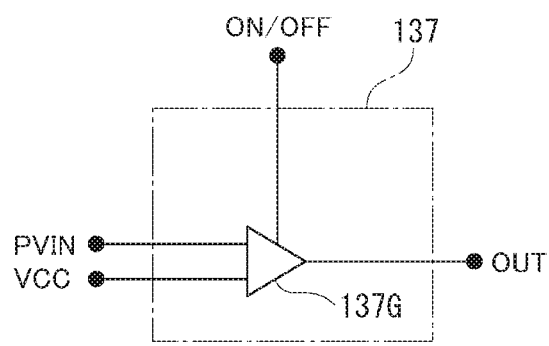
FIG. 31 is a circuit diagram of a voltage detection circuit according to another variation.

As shown in FIG. 31, the voltage detection circuit 137 detects the charging state by comparing the output voltage (terminal voltage PVIN) of the solar cell 135 with the terminal voltage VCC of the storage battery 130 using a comparator 137G.

Operation of the voltage detection circuit 137, or more specifically operation of the comparator 137G, is controlled by an on/off signal from the control circuit 300.

If the output voltage of the solar cell is greater than the battery voltage, the comparator 137G determines charging is in progress, and outputs a HIGH signal to the control circuit 300 from the output (OUT).

If the output voltage of the solar cell is lower than the battery voltage, the comparator 137G determines charging is not in progress, and outputs a LOW signal to the control circuit 300 from the output (OUT).

This detection by the voltage detection circuit 137 is done when the charging control switch 132 is off.

If the output voltage of the solar cell 135 is detected when the charging control switch 132 is on, the threshold of the comparator must be set to approximately 0.15 V, which is the potential difference of the ends of the diode 131. Because high detection precision is required in this event, the circuit becomes more complicated and detection errors increase.

Figure 32:
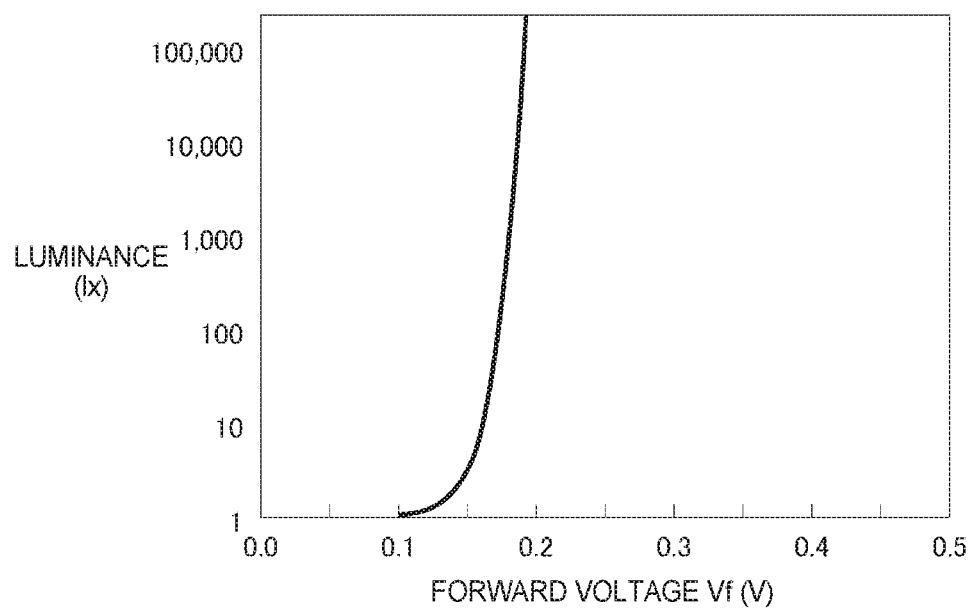
FIG. 32 shows the relationship between the forward voltage of the diode and the luminance of light incident to the solar cell.

Furthermore, as shown in the graph in FIG. 32 showing the relationship between the luminance (Lx) of light incident to the solar cell 135 and the forward voltage Vf of the diode 131, because the forward voltage Vf reaches 0.15 V at a luminance of 5 Lx, data detection errors may occur when a minimal amount of light is incident.

To avoid this problem, the voltage detection circuit 137 detects the voltage difference between the output voltage of the solar cell 135 and the battery voltage of the storage battery 130 when the charging control switch 132 is off.

In each of the foregoing embodiments, the electronic timepiece outputs a pulse to the motor coil to transmit signals, but the invention is not so limited.

For example, the coil of a buzzer, or the coil used to drive an EL (electro-luminescent) light used for illumination, may be used as the coil for transmitting signals. Furthermore, if the electronic timepiece is a radio-controlled timepiece with an antenna for receiving long-wave standard time signals, the antenna coil may be used for signal transmission.

Further alternatively, the electronic timepiece may include a light-emitting device, and transmit signals by the electronic timepiece turning the light-emitting device on and off. In this configuration, the communication device has a photodetector, and receives signals by detecting the output voltage of the photodetector.

Figure 33:
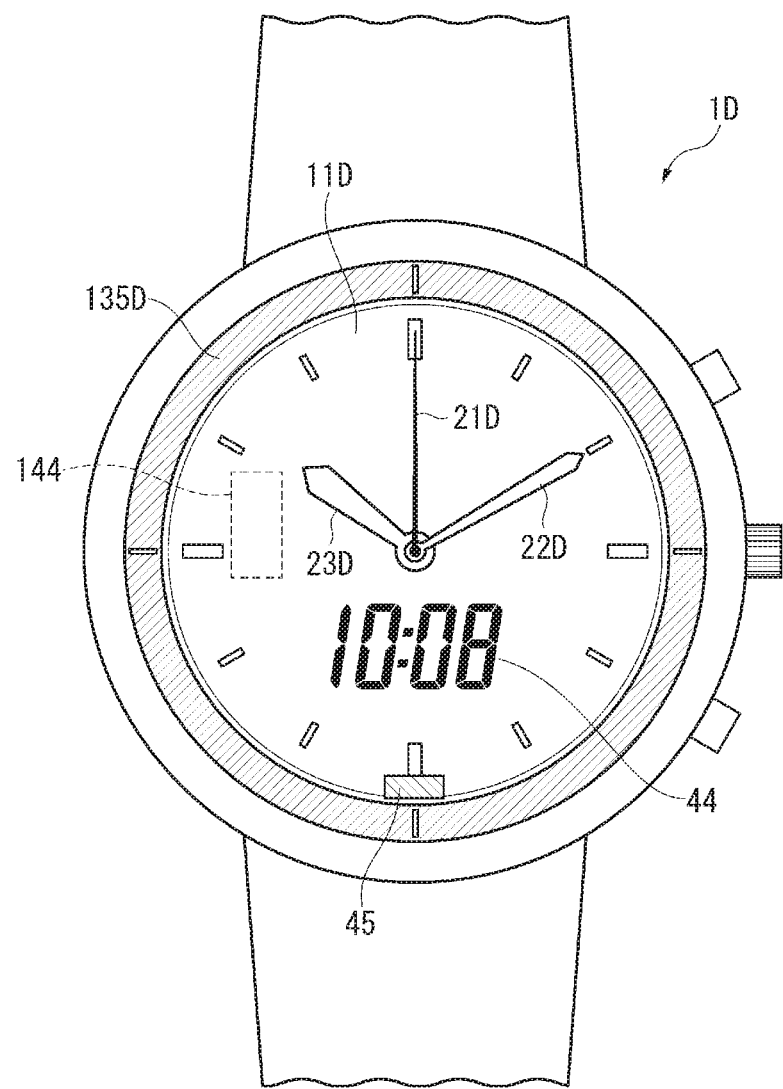
FIG. 33 is a plan view of an electronic timepiece according to another variation.

FIG. 33 shows the face of an electronic timepiece 1D in another embodiment.

In addition to hands 21D (second hand), 22D (minute hand), 23D (hour hand), this electronic timepiece 1D has a display device 44 capable of digitally displaying the time. The display device 44 may be an LCD device or EPD (electrophoretic display).

An LED 45 for illumination is also disposed near the display device 44.

The electronic timepiece 1D also has a buzzer for sounding an alarm, for example, and produces sound by driving a buzzer coil 144 (step-up coil) to make a ceramic device attached to the back cover oscillate.

The electronic timepiece 1D also has a ring-shaped solar cell module 135D disposed around the outside of the dial 11D. This solar cell module 135D is a module comprising four solar cells.

The electronic timepiece 1D transmits signals by controlling the backlight of the LCD device or the LED 45, which are light-emitting devices, to turn on or off.

The electronic timepiece 1D also transmits signals by outputting pulses (transmission pulses) to the buzzer coil 144.

In the third embodiment, the length of the reception pause during the communication process may be increased, and a delay (specific time) for charging the storage battery 130 may be provided in the reception pause before or after the memory controller 360 writes the one block of received data to the EEPROM 220.

Because the process of saving data signals to EEPROM 220 consumes power, a drop in battery capacity can be prevented while storing data signals to EEPROM 220, and data signals can be reliably stored to EEPROM 220, by charging the storage battery 130 during a delay before storing data signals to EEPROM 220.

Furthermore, by charging the storage battery 130 during a delay after storing data signals to EEPROM 220, the battery capacity can be automatically restored even if the battery capacity drops as a result of storing the data signals to EEPROM 220.

Note that this delay period may also only be inserted when the battery capacity of the storage battery 130 is low.

In the foregoing embodiments, the timepiece-side transmission controller 341 may change the length of the reception period and the charging periods C1, C2 by changing the transmission interval of data request signals according to the output voltage of the battery voltage detection circuit.

In this event, by increasing the reception period and increasing the charging periods C1, C2 when the battery capacity can be determined low, a drop in the battery capacity can be reliably suppressed. In addition, when the battery capacity can be determined to be high, the communication period can be shortened by shortening the charging period and shortening the reception period.

The length of the transmission period of data signals, and the length of the reception period allocated to data signals in the electronic timepiece, are the same in the foregoing embodiments, but the invention is not so limited. For example, if the transmission period includes the detection period D1 and is longer than the detection period D1, the transmission period may be shorter than the reception period.

The electronic timepiece in the foregoing embodiments has a battery voltage detection circuit for detecting the battery voltage of the storage battery, but the invention is not so limited. More specifically, the battery voltage detection circuit may be omitted.

Each time a data request signal is sent from the electronic timepiece to the communication device in the foregoing embodiments, the update data is sent one bit at a time from the communication device to the electronic timepiece, but the invention is not so limited. For example, each time a data request signal is received, the communication device may transmit the update data in blocks of plural bits at a time.

In this event, the electronic timepiece may set a charging period at some point in the reception period for receiving a data signal of plural bits instead of setting a charging period after each reception period that receives a data signal of one bit.

An example of the signal output timing in this event is described below. As shown in the timing chart in FIG. 34A to G, when a data request signal is received from the electronic timepiece at time T1 (FIG. 34A, 34B), the communication device sends the data signal of the first bit to the electronic timepiece during the period to time T4 (FIG. 34C), which is the transmission time of the data signal for the next bit.

The electronic timepiece holds the charging control switch 132 on for the period (charging period C1) from time T1 to time T2 when detection of the output voltage of the solar cell 135 starts (FIG. 34D). Because the solar cell 135 is generating power at this time (FIG. 34F), the power output from the solar cell 135 is supplied to the storage battery 130, and the storage battery 130 is charged.

At time T2, the electronic timepiece changes the charging control switch 132 to off (FIG. 34D), and operates the voltage detection circuit 133 (FIG. 34E). Then at time T3, the falling edge of the operating pulse, the electronic timepiece evaluates the received signal (FIG. 34G). More specifically, the output voltage of the solar cell 135 is detected for the period from time T2 to time T3 (detection period D1).

Then at time T4, the communication device transmits the data signal of the next one bit to the electronic timepiece during the period to time T7, which is the time to transmit the data signal of the subsequent one bit (FIG. 34C).

The electronic timepiece then operates the voltage detection circuit 133 at time T5 (FIG. 34E), and confirms evaluation of the received signal at time T6 at the falling edge of the operating pulse (FIG. 34G). More specifically, the output voltage of the solar cell 135 is detected during the period (detection period D1) from time T5 to time T6 (FIG. 34E).

Then at time T7, the communication device transmits the data signal of the next one bit to the electronic timepiece during the period to time T10, which is the time to transmit the data signal of the subsequent one bit (FIG. 34C).

The electronic timepiece then operates the voltage detection circuit 133 at time T8 (FIG. 34E), and confirms evaluation of the received signal at time T9 at the falling edge of the operating pulse (FIG. 34G). More specifically, the output voltage of the solar cell 135 is detected during the period (detection period D1) from time T8 to time T9 (FIG. 34E).

The electronic timepiece holds the charging control switch 132 on for the period (charging period C2) from time T9 to time T10 (FIG. 34D). Because the solar cell 135 is generating power at this time, the power output from the solar cell 135 is supplied to the storage battery 130, and the storage battery 130 is charged.

In the example in FIG. 34A to G, the charging control switch 132 is off from time T2 to time T9, and there is no charging period. More specifically, there is no charging period in the reception period of the data signal for the second bit, but the storage battery 130 can be charged in the charging periods C1, C2 during the reception periods of the data signals for the first and third bits.

In the example in FIG. 34A to G, the total charging period is shorter than when there is a charging period in each reception period for receiving the data signal of one bit as in the foregoing embodiments. The embodiments described above are therefore preferable if a longer overall charging period is desirable.

The communication device may also transmit update data to the electronic timepiece after the communication process with the electronic timepiece starts without receiving a data request signal. In this case, in the third embodiment, the communication device stops transmission of update data for a preset time after transmitting one block of update data, and the data writing process can run on the electronic timepiece during this preset time.

The detection period D1 and the off period of the charging control switch match in the foregoing embodiments, but the invention is not so limited and these periods may be different.

In the second embodiment, the emission controller 650 drives the light-emitting device 56 at a low luminance level in S41 and S42, but the invention is not so limited. For example, the light-emitting device 56 may be driven at a high luminance level if shortening the charging period is desirable.

In the fourth embodiment, the timepiece-side transmission controller 341 of the electronic timepiece may send the result to the communication device after the configuration process that sets the data signal evaluation method ends. This enables the communication device to confirm that the configuration process was completed correctly on the electronic timepiece.

The device-side transmission controller 642 in the foregoing embodiments reads the update data stored in the update data storage 622, but the invention is not so limited.

For example, the device-side transmission controller 642 may be configured to control the storage media reader 65 to read the update data stored on a storage medium, or control the communication interface 63 to read update data stored on a personal computer or electronic device, or update data accessible over a network.

The timepiece-side receiver 170 in the foregoing embodiments has receives signals by detecting the output voltage of a solar cell, but the invention is not so limited. For example, signals may be received by detecting the output voltage of the solar cell.

In addition, the device-side receiver 68 receives signals by detecting the voltage of the coil 55, but the invention is not so limited. For example, signals may be received by detecting the current of the coil 55.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2015-104460, filed May 22, 2015 is expressly incorporated by reference herein.

What is claimed is:

1. An electronic timepiece comprising:
   a solar cell that receives light and generates power;
   a detection circuit configured to detect an output value of the solar cell;
   a storage battery charged by power generated by the solar cell;
   a charging control circuit configured to connect and disconnect the solar cell and the storage battery; and
   a control circuit configured to control the detection circuit and the charging control circuit,
   set a detection period in which the control circuit detects the output value of the solar cell and receives an optical signal, and a charging period in which the storage battery can be charged, during a reception period for receiving a data signal of transmission data transmitted from a communication target,
   control the charging control circuit to disconnect the solar cell and the storage battery, and cause the detection circuit to detect the output value of the solar cell, during the detection period, and
   control the charging control circuit to connect the solar cell and the storage battery during the charging period.

2. The electronic timepiece described in claim 1, further comprising:
   a transmission coil, and
   a coil drive circuit configured to drive the transmission coil;
   wherein the control circuit controls the coil drive circuit to transmit a data request signal requesting transmission of the data signal by electromagnetic coupling, and
   the reception period is a period after the data request signal is transmitted and until the next data request signal is transmitted.

3. The electronic timepiece described in claim 1, further comprising:
   the data signal is transmitted one bit at a time from the communication target; and
   the control circuit sets the detection period and the charging period in each reception period receiving the data signal of one bit.

4. The electronic timepiece described in claim 1, further comprising:
   a data signal storage configured to store the received data signal;
   wherein each time one block of data signals is received, the control circuit stores the received one block of data signals, and
   controls the charging control circuit to connect the solar cell and the storage battery while storing the one block of data signals to the data signal storage.

5. The electronic timepiece described in claim 1, further comprising:
   a data signal storage configured to store the received data signal;
   wherein each time one block of data signals is received, the control circuit stores the received one block of data signals, and
   controls the charging control circuit to connect the solar cell and the storage battery during a specific time before or after storing the one block of data signals to the data signal storage.

6. The electronic timepiece described in claim 1, further comprising:
   a battery voltage detection circuit configured to detect the battery voltage of the storage battery;
   wherein if the value detected by the battery voltage detection circuit is greater than or equal to a threshold in the charging period, the control circuit controls the charging control circuit to disconnect the solar cell and the storage battery.

7. The electronic timepiece described in claim 1, further comprising:
   a battery voltage detection circuit configured to detect the battery voltage of the storage battery;
   wherein the control circuit sets the length of the reception period and the charging period according to the value detected by the battery voltage detection circuit.

8. A communication system comprising an electronic timepiece and a communication device;
   the electronic timepiece including a solar cell that receives light and generates power;
   a detection circuit configured to detect an output value of the solar cell;
   a storage battery charged by power generated by the solar cell;
   a charging control circuit configured to connect and disconnect the solar cell and the storage battery; and
   a control circuit configured to control the detection circuit and the charging control circuit,
   set a detection period in which the control circuit detects the output value of the solar cell and receives an optical signal, and a charging period in which the storage battery can be charged, during a reception period for receiving a data signal of transmission data transmitted from a communication device,
   control the charging control circuit to disconnect the solar cell and the storage battery, and cause the detection circuit to detect the output value of the solar cell, during the detection period, and
   control the charging control circuit to connect the solar cell and the storage battery during the charging period; and
   the communication device including a light-emitting device configured to emit light;
   a light-emitting device drive circuit configured to drive the light-emitting device; and a device-side transmission controller configured to control the light-emitting device drive circuit and transmit the data signal by light by changing the emission state of the light-emitting device according to the value of the data signal of the transmission data, the device-side transmission controller maintaining the emission state of the light-emitting device in the state corresponding to the value of the data signal during a period in the reception period that includes the detection period and is longer than the detection period.

9. The communication system described in claim 8, wherein:

a first signal and a second signal of different values are included as the data signals in the transmission data; and the device-side transmission controller executes an evaluation process determining whether the first signals or the second signals contained in the transmission data are most numerous;

causes the light-emitting device to emit if the data signal is the first signal, and turns the light-emitting device off if the data signal is the second signal, when the number of first signals is greater than the number of second signals; and turns the light-emitting device off if the data signal is the first signal, and causes the light-emitting device to emit if the data signal is the second signal, when the number of second signals is greater than the number of first signals; and the control circuit of the electronic timepiece receives the first signals and the second signals according to result of the evaluation process.

* * * * *